US011232339B2

(12) United States Patent
Lee et al.

(10) Patent No.: US 11,232,339 B2
(45) Date of Patent: Jan. 25, 2022

(54) HANDHELD ELECTRONIC DEVICE CAPABLE OF MAGNETIC FIELD COMMUNICATION AND PAYMENT METHOD USING THE SAME

(71) Applicant: Samsung Electronics Co., Ltd., Gyeonggi-do (KR)

(72) Inventors: Woosup Lee, Gyeonggi-do (KR); Mooyoung Kim, Seoul (KR); Jungsik Park, Gyeonggi-do (KR); Seongmin Kim, Gyeonggi-do (KR); Younju Kim, Gyeonggi-do (KR); Hyeongtae Kim, Gyeonggi-do (KR); Donghun Park, Gyeonggi-do (KR); Jaewoong Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 833 days.

(21) Appl. No.: 15/052,749

(22) Filed: Feb. 24, 2016

(65) Prior Publication Data
US 2016/0247057 A1 Aug. 25, 2016

(30) Foreign Application Priority Data
Feb. 24, 2015 (KR) .......................... 10-2015-0025745

(51) Int. Cl.
*G06Q 20/32* (2012.01)
*G06Q 20/40* (2012.01)
(Continued)

(52) U.S. Cl.
CPC ....... *G06K 19/0727* (2013.01); *G06K 7/0004* (2013.01); *G06K 7/089* (2013.01);
(Continued)

(58) Field of Classification Search
CPC ......... G06K 19/0727; G06K 19/07784; G06K 19/06206; G06K 7/0004; G06K 7/089;
(Continued)

(56) References Cited

U.S. PATENT DOCUMENTS 4,701,601 A 10/1987 Francini et al.
6,206,293 B1 3/2001 Gutman et al.
(Continued)

FOREIGN PATENT DOCUMENTS

CN 1908981 A 2/2007
CN 101828205 A 9/2010
(Continued)

OTHER PUBLICATIONS

Office Action in connection with European Application No. 16157059.3 dated Dec. 17, 2019, 13 pages.
(Continued)

*Primary Examiner* — Johann Y Choo

(57) ABSTRACT

Various embodiments provide a handheld electronic device capable of magnetic field communication. The handheld electronic device includes: a first cover, a second cover, a memory, a display, a processor, first and second antennas, and at least one sensor. The memory stores instructions that enable the processor to: store payment information in the memory; display at least one image or text related to the payment information on the display, in response to at least part of a user input; determine whether a payment process starts by using the electronic device; and transmit, according to the determination as to whether a payment process starts, a first signal related to the payment information via the first antenna, and allow an external device to read the payment information via the second antenna.

18 Claims, 38 Drawing Sheets

(51) Int. Cl.
*G07F 7/08* (2006.01)
*G06K 19/07* (2006.01)
*H04B 1/3827* (2015.01)
*G06K 19/077* (2006.01)
*G06K 19/06* (2006.01)
*G06K 7/00* (2006.01)
*G06K 7/08* (2006.01)
*H04B 5/00* (2006.01)

(52) U.S. Cl.
CPC . *G06K 19/06206* (2013.01); *G06K 19/07779* (2013.01); *G06K 19/07784* (2013.01); *G06Q 20/3221* (2013.01); *G06Q 20/3227* (2013.01); *G06Q 20/3278* (2013.01); *G06Q 20/401* (2013.01); *G07F 7/0893* (2013.01); *H04B 1/3833* (2013.01); *H04B 5/0031* (2013.01)

(58) Field of Classification Search
CPC .......... G06K 19/07779; G06Q 20/401; G06Q 20/3227; G06Q 20/3221; G06Q 20/3278; G06Q 20/321; G06Q 20/327; G07F 7/0893; H04B 1/3833; H04B 5/0031; H04B 5/0025
See application file for complete search history.

(56) References Cited

U.S. PATENT DOCUMENTS

| | | | |
|---|---|---|---|
| 8,255,323 | B1 | 8/2012 | Casey et al. |
| 8,814,046 | B1 | 8/2014 | Wallner |
| 10,236,942 | B2 * | 3/2019 | Lee ................. H04M 1/725 |
| 2003/0103414 | A1 * | 6/2003 | Lyon ................ H04W 12/068 368/10 |
| 2005/0194452 | A1 | 9/2005 | Nordentoft et al. |
| 2007/0022058 | A1 | 1/2007 | Labrou et al. |
| 2007/0293225 | A1 * | 12/2007 | Kangude ............ H04W 36/165 455/436 |
| 2008/0011833 | A1 * | 1/2008 | Saarisalo .............. G06Q 20/32 235/382 |
| 2009/0065571 | A1 | 3/2009 | Jain |
| 2009/0191811 | A1 * | 7/2009 | Griffin ............... G06Q 20/102 455/41.1 |
| 2010/0063893 | A1 * | 3/2010 | Townsend .......... G06Q 20/325 705/26.1 |
| 2010/0265037 | A1 * | 10/2010 | Domsten ............. G07F 7/1008 340/5.82 |
| 2011/0010234 | A1 * | 1/2011 | Lindelsee .......... G06Q 20/3223 705/14.23 |
| 2011/0022755 | A1 * | 1/2011 | Sueyoshi ............ H04B 5/0031 710/109 |
| 2013/0065648 | A1 | 3/2013 | Kim et al. |
| 2013/0200999 | A1 | 8/2013 | Spodak et al. |
| 2013/0267170 | A1 | 10/2013 | Chong et al. |
| 2013/0332228 | A1 | 12/2013 | Lim et al. |
| 2014/0011452 | A1 | 1/2014 | Ji et al. |
| 2014/0081785 | A1 | 3/2014 | Valadas Preto |
| 2014/0101737 | A1 | 4/2014 | Rhee |
| 2014/0227974 | A1 | 8/2014 | Perkins et al. |
| 2014/0246490 | A1 | 9/2014 | Graylin |
| 2014/0249948 | A1 | 9/2014 | Graylin et al. |
| 2014/0269946 | A1 | 9/2014 | Wallner |
| 2015/0332258 | A1 * | 11/2015 | Kurabi ............... G06Q 20/3278 705/71 |

FOREIGN PATENT DOCUMENTS

| | | |
|---|---|---|
| CN | 103116842 A | 5/2013 |
| CN | 103503035 A | 1/2014 |
| CN | 104123643 A | 10/2014 |
| KR | 10-2005-0023000 A | 3/2005 |
| KR | 10-2013-0005789 A | 1/2013 |
| KR | 10-2013-0027988 A | 3/2013 |
| KR | 10-2013-0113222 A | 10/2013 |
| KR | 10-2013-0138659 A | 12/2013 |
| KR | 20140086363 A | 7/2014 |
| KR | 101451222 B1 | 10/2014 |
| WO | 2014/007491 A1 | 1/2014 |

OTHER PUBLICATIONS

Wikipedia, "Near field communication," Aug. 2014, 16 pages.
Decision to refuse dated May 7, 2021, in connection with a counterpart European patent application No. 16157059.3, 24 pages.
Office Action dated May 31, 2021, in connection with a counterpart Korean application No. 10-2015-0025745, 21 pages.
The First Office Action dated Jun. 10, 2021, in connection with a counterpart Chinese application No. 201610101210.9, 18 pages.
Foreign Communication From a Related Counterpart Application, European Application No. 16157059.3, Extended European Search Report dated Jan. 4, 2017, 16 pages.
Extended European Search Report dated Jul. 5, 2016 in connection with European Application No. 16157059.3, 9 pages.
Scott Stein, "Samsung's LoopPay: What It Is and Why You Should Care", CNET, Feb. 19, 2015, XP055284202, URL:http://www.cnet.com/news/samsungs-looppay-what-it-is-and-why-you-should-care/, 3 pages.
Ali Salman, "Samsung Acquires LoopPay—Introduces NFC and Magnetic Secure Transmission Methods", WCCFtech, Feb. 20, 2015 , URL: http://wccftech.com/samsung-acquires-looppay-introduces-nfc-magnetic-secure-transmission-methods/, 2 pages.
Foreign Communication from Related Counterpart Application; Korean Patent Application No. 10-2017-0047882; Decision of Patent Grant dated Jun. 20, 2017.

\* cited by examiner

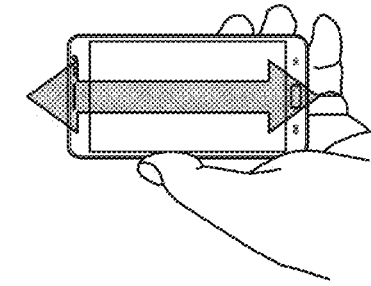
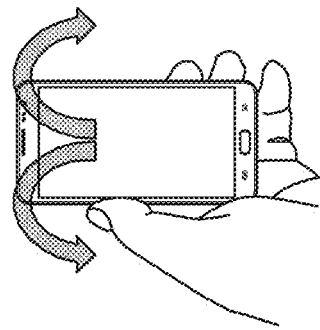
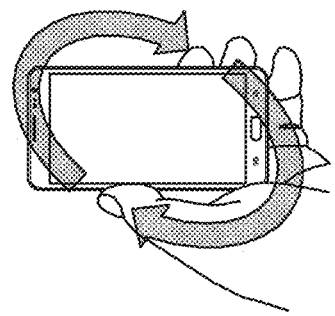
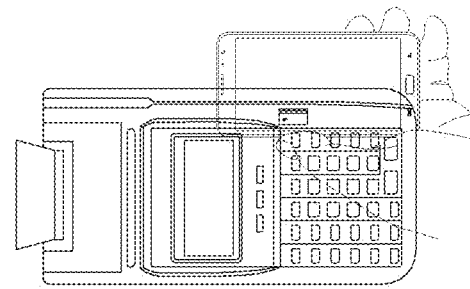
FIG. 8B

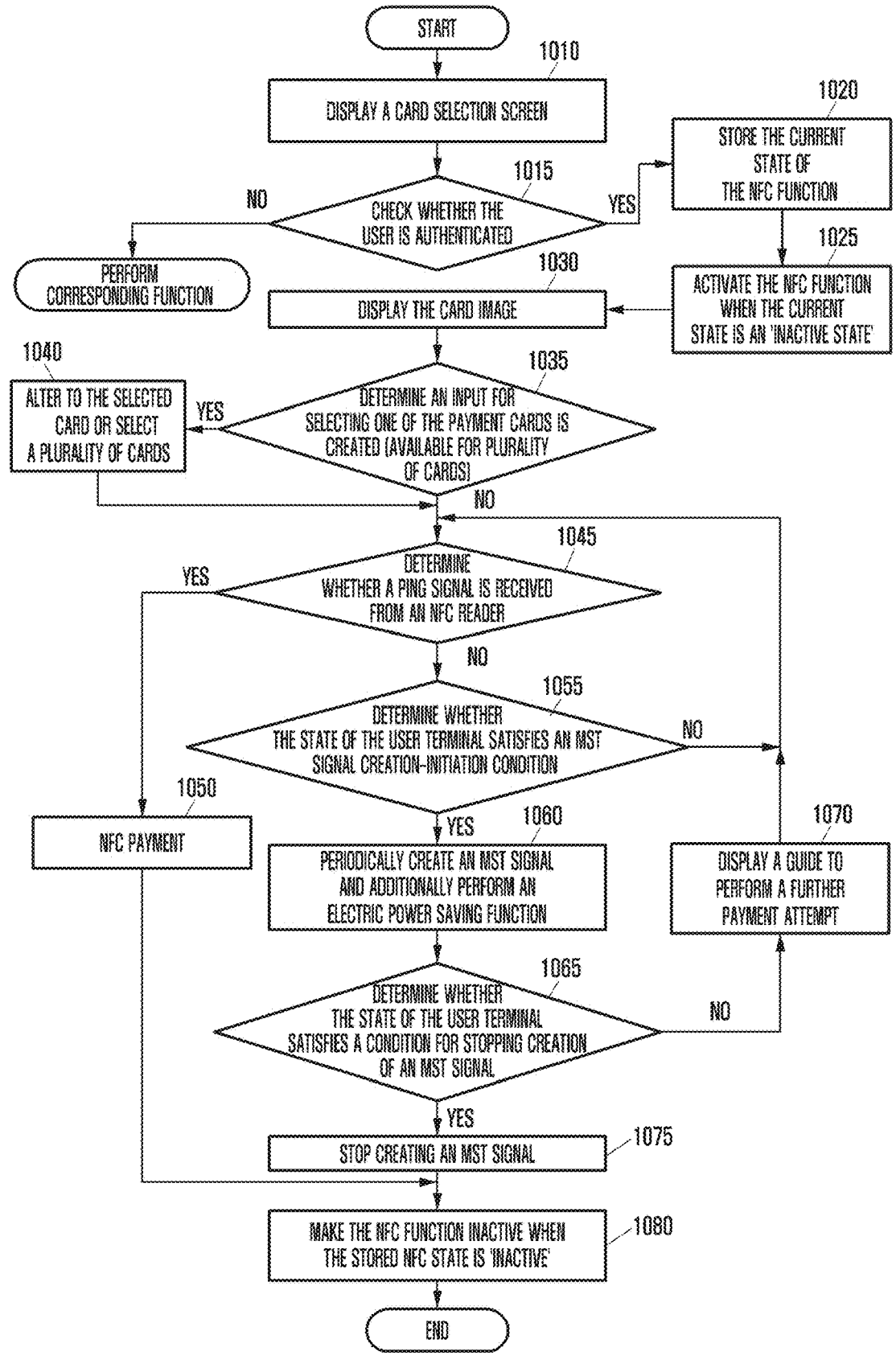

HANDHELD ELECTRONIC DEVICE CAPABLE OF MAGNETIC FIELD COMMUNICATION AND PAYMENT METHOD USING THE SAME

CROSS-REFERENCE TO RELATED APPLICATION AND CLAIM OF PRIORITY

The present application relates to and claims benefit under 35 U.S.C. § 119(a) of Korean patent application filed on Feb. 24, 2015 in the Korean Intellectual Property Office and assigned Serial number 10-2015-0025745, the entire disclosure of which is hereby incorporated by reference.

TECHNICAL FIELD

Various embodiments of the present invention relate to a handheld electronic device capable of magnetic field communication and a method for the electronic device to make a payment via magnetic field communication with a card reading apparatus.

BACKGROUND

In general, card reading apparatuses are equipped with a coil and a header for reading information from magnetic stripe tracks of a magnetic card. When a track of a magnetic card (i.e., a magnetic black line) is swiped over the header of the rail of a card reading apparatus, the lines of magnetic force passing through the coil connected to the header are changed. The change in the lines of magnetic force induces current in the card reading apparatus. The card reading apparatus is capable of reading and processing information recorded in the card tracks from the induced current.

Handheld electronic devices such as smartphones, etc. are capable of including a module for magnetic field communication, so that they can make magnetic field communication with other devices via the module.

In a magnetic field communication system, near field communication (NFC) is performed in such a way that: one host (e.g., a card reading apparatus, a card reader, a payment receiving apparatus) transmits 'ping' (which refers to a feedback signal to indicate the host's presence) to another adjacent host (e.g., a user's handheld electronic device) and receives information in response to the ping therefrom. However, most of the card reading apparatuses installed at offline stores, etc. are in an environment lacking the infrastructure for NFC. Therefore, a new system is required for conventional card reading apparatuses (which are capable of only recognizing magnetic cards) to make a payment via magnetic field communication with handheld electronic devices.

SUMMARY

To address the above-discussed deficiencies, it is a primary object to provide a method to resolve the above problems, and an electronic device adapted to the method.

The present invention further provides a method of making an easy payment by a motion of a handheld electronic device (e.g., a motion requiring that the user simply holds the handheld electronic device near a card reading apparatus), and the electronic device adapted to the method.

In accordance with various embodiments of the present invention, a handheld electronic device is provided. The handheld electronic device includes: a first cover on a front side of the electronic device; a second cover on a back side of the electronic device; a memory contained in a hollow area formed between the first and second covers; a display partially contained in the hollow area and disclosed through the first cover; a processor contained in the hollow area and electrically connected to the memory; first and second antennas contained in the hollow area and electrically connected to the processor; and at least one sensor contained in the hollow area and electrically connected to the processor. The memory stores instructions that enable the processor to: store payment information in the memory; display at least one image or text related to the payment information on the display, in response to at least part of a user input; determine whether a payment process starts by using the electronic device; transmit, according to the determination as to whether a payment process starts, a first signal related to the payment information via the first antenna; and allow an external device to read the payment information via the second antenna.

In accordance with various embodiments of the present invention, a method of operating an electronic device is provided. The method includes: displaying an object related to a card to be used to make a payment; checking a condition to perform a payment process; and providing, according to the checking condition, payment information by using a magnetic field signal.

In accordance with another embodiment of the present invention, an electronic device is provided. The electronic device includes: a first cover on a front side of the electronic device; a second cover on a back side of the electronic device; a memory contained in a hollow area formed between the first and second covers; a processor contained in the hollow area and electrically connected to the memory; and first and second antennas contained in the hollow area and electrically connected to the processor. The memory stores instructions that enable the processor to: store payment information in the memory; determine whether a payment process starts by using the electronic device; transmit, according to the determination as to whether a payment process starts, a first signal related to the payment information via the first antenna; and allow an external device to read the payment information via the second antenna.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A and 8B are diagrams that describe a method of creating an MST signal in response to a particular gesture applied to a device, according to various embodiments of the present disclosure;

FIG. 10 is a flow diagram that describes a payment method according to a first embodiment of the present disclosure;

DETAILED DESCRIPTION

Figure 1A:
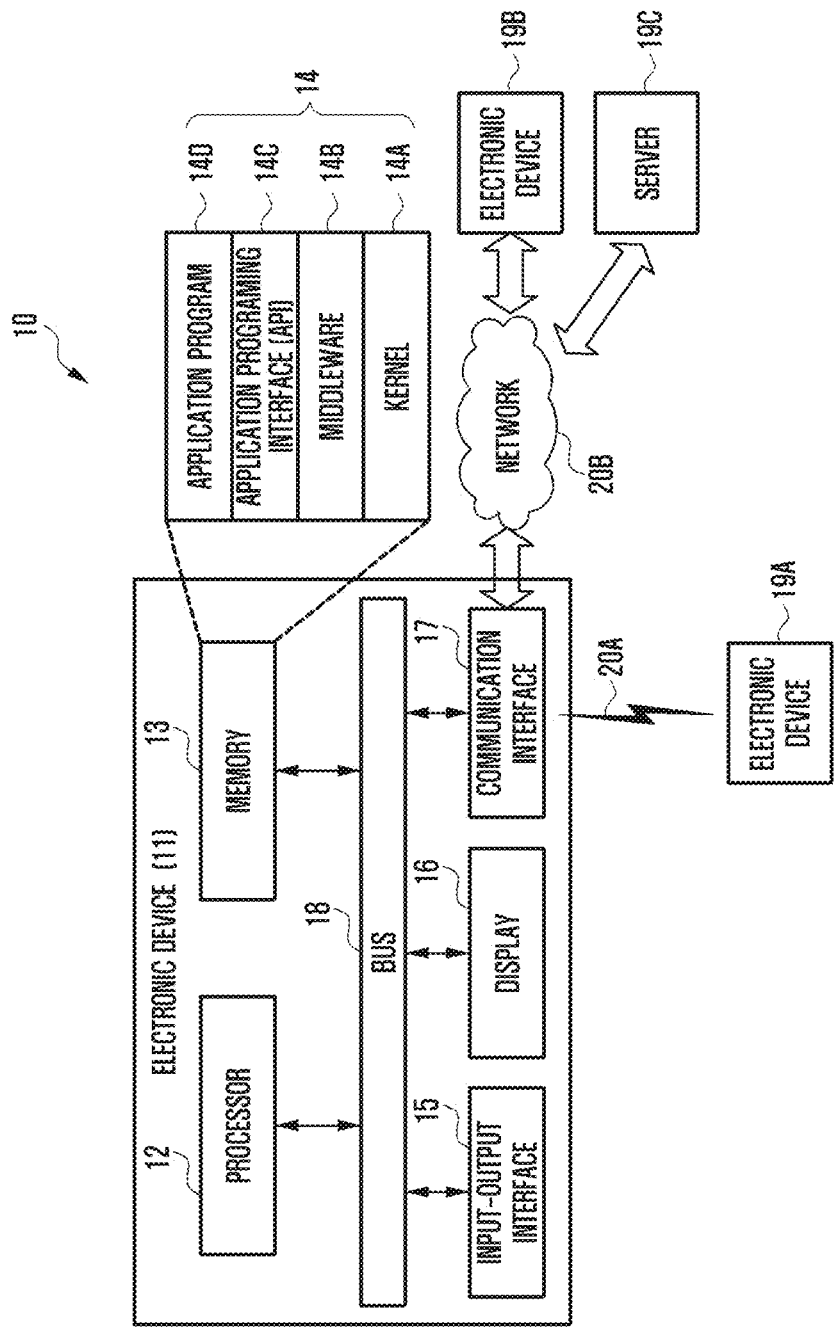
FIG. 1A is a diagram showing a network environment including a handheld electronic device according to various embodiments of the present disclosure.

FIGS. 1A through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter, the present disclosure is described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component. In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

In the present disclosure, the term 'screen' may refer to the displaying area of a display unit. For example, in the expressions 'a card (or image thereof) is displayed on the screen,' 'the display unit shows (displays) a card on the screen,' and 'the controller controls the display unit to show (display) a card on the screen,' the term 'screen' is used in the sense of a displaying area of the display unit. In addition, the term 'screen' may refer to a displayed object shown on the display unit. For example, in the expressions 'a card screen is displayed,' 'the display unit shows (displays) a card screen,' and 'the controller controls the display unit to show (display) a card screen,' the term 'screen' is used in the sense of a displayed object shown on the display unit.

The terms used in describing various embodiments of the present disclosure are only examples for describing a specific embodiment but do not limit the various embodiments of the present disclosure. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device may be a smart home appliance having a communication function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, SAMSUNG HOMESYNC™, APPLE TV™, or GOOGLE TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

A handheld electronic device according to various embodiments of the present disclosure may include a combination of the components or devices listed above. The handheld electronic device may also be a flexible device. It is obvious to those skilled in the art that the handheld electronic device is not limited to the aforementioned devices.

When a handheld electronic device according to various embodiments of the present disclosure produces a magnetic field signal, a card reading apparatus is capable of producing the same amount of current as a magnetic card is swiped over the header of the card reading apparatus. That is, the user makes payment for costs, etc. as he/she holds the handheld electronic device up to or near a card reading apparatus.

Magnetic field communication may be implemented with near field communication (NFC), Magnetic Secure Transmission or near field Magnetic data Stripe Transmission (MST), etc. These communication methods are distinguished from each other, in terms of data rate (bit/sec), communication range, and frequency band. While NFC provides bidirectional communication capability, MST has unidirectional communication capability (e.g., one party transmits information without a ping signal and another receives it at the same time).

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

FIG. 1 illustrates a network environment 10 including an electronic device 11 according to various embodiments of the present disclosure. The electronic device 11 may include a bus 18, a processor 12, a memory 13, an input/output interface 15, a display 16, and a communication interface 17. According to some embodiments, at least one of the above described components may be omitted from the electronic device 11 or another component may be further included in the electronic device 11.

The bus 18 may be a circuit connecting the processor 12, memory 13, the input/output interface 15, the display 16, the communication interface 17 and transmitting communications (e.g., control messages and/or data) between the above described components.

The processor 12 is capable of including one or more of the following: a central processing unit (CPU), an application processor (AP), and a communication processor (CP). The processor 12 is capable of controlling at least one of other components of the electronic device 11 and/or processing data or operations related to communication.

The memory 13 is capable of including volatile memory and/or non-volatile memory. The memory 13 is capable of storing data or commands related to at least one of other components of the electronic device 11. According to an embodiment, the memory 13 is capable of storing software and/or a program module 14. For example, the program module 14 is capable of including a kernel 14A, middleware 14B, application programming interface (API) 14C, application programs (or applications) 14D, etc. The kernel 14A, middleware 14B or at least part of the API 14C may be called an operating system (OS).

The kernel 14A is capable of controlling or managing system resources (e.g., the bus 18, processor 12, memory 13, etc.) used to execute operations or functions of other programs (e.g., the middleware 14B, API 14C, and application programs 14D). The kernel 14A provides an interface capable of allowing the middleware 14B, API 14C, and application programs 14D to access and control/manage the individual components of the electronic device 11.

The middleware 14B is capable of mediating between the API 14C or application programs 14D and the kernel 14A so that the API 14C or the application programs 14D can communicate with the kernel 14A and exchange data therewith. The middleware 14B is capable of processing one or more task requests received from the application programs 14D according to the priority. For example, the middleware 14B is capable of assigning a priority for use of system resources of the electronic device 11 (e.g., the bus 18, processor 12, memory 13, etc.) to at least one of the application programs 14D. For example, the middleware 14B processes one or more task requests according to a priority assigned to at least one application program, thereby performing scheduling or load balancing for the task requests.

The API 14C refers to an interface configured to allow the application programs 14D to control functions provided by the kernel 14A or the middleware 14B. The API 14C is capable of including at least one interface or function (e.g., instructions) for file control, window control, image process, text control, or the like.

The input/output interface 15 is capable of transferring instructions or data, received from the user or external devices, to one or more components of the electronic device 11. The input/output interface 15 is capable of outputting instructions or data, received from one or more components of the electronic device 11, to the user or external devices.

The display 16 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, etc. The display 16 is capable of displaying various types of content (e.g., texts, images, videos, icons, symbols, etc.). The display 16 may also be implemented with a touch screen. In this case, the display 16 is capable of receiving touches, gestures, proximity inputs or hovering inputs, via a stylus pen, or a user's body.

The communication interface 17 is capable of establishing communication between the electronic device 11 and an external device (e.g., a first external device 19A, a second electronic device 19B, or a server 19C). For example, the communication interface 17 is capable of communicating with an external device (e.g., a second external device 19B or a server 19C) connected to the network 20B via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-range communication 20A. Short-wireless communication 20A may include at least one of the following: wireless fidelity (WiFi), BLUETOOTH (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called 'Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 20B may include at least one of the following: a telecommunications network, e.g., a computer network (e.g., LAN or WAN), the Internet, and a telephone network.

The first and second external electronic devices 19A and 19B are each identical to or different from the electronic device 11, in terms of type. According to an embodiment, the server 19C is capable of including a group of one or more servers. According to various embodiments, part or all of the operations executed on the electronic device 11 may be executed on another electronic device or a plurality of other electronic devices (e.g., electronic devices 19A and 19B or a server 19C). According to an embodiment, when the electronic device needs to perform a function or service automatically or according to a request, it does not perform the function or service, but is capable of additionally requesting at least part of the function related to the function or service from other electronic device (e.g., electronic devices 19A and 19B or a server 19C). The other electronic device (e.g., electronic devices 19A and 19B or a server 19C) is capable of executing the requested function or additional functions, and transmitting the result to the electronic device 11. The electronic device 11 processes the received result, or further proceeds with additional processes, to provide the requested function or service. To this end, the electronic device 11 may employ cloud computing, distributed computing, or client-server computing technology.

Figure 1B:
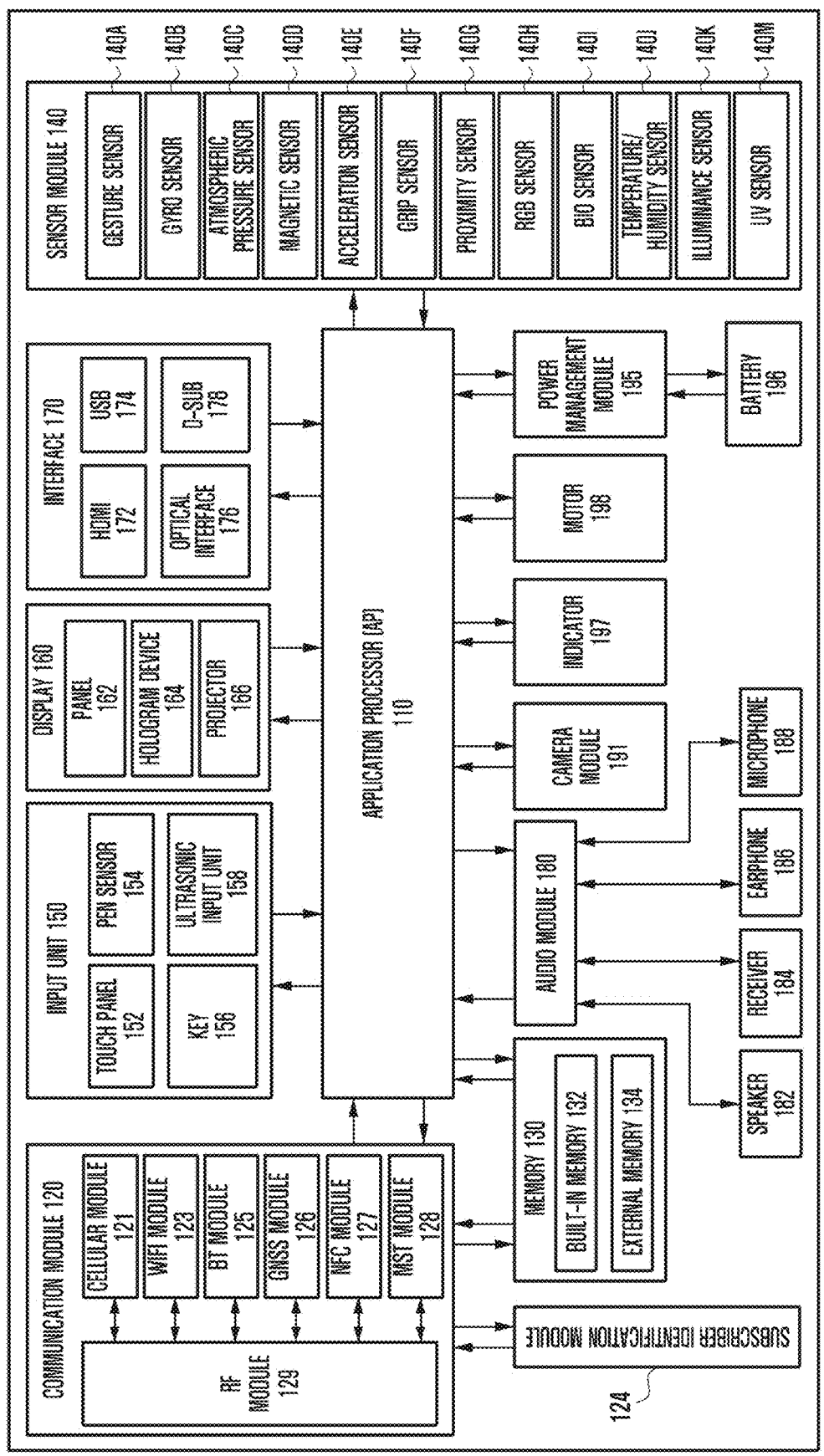
FIG. 1B is a detailed block diagram showing a configuration of a handheld electronic device according to various embodiments of the present disclosure.

FIG. 1B is a detailed block diagram showing a configuration of an electronic device 101 according to various embodiments. For example, the electronic device 101 is capable of including part or all of the components in the electronic device 11 shown in FIG. 1A. The electronic device 101 is capable of including one or more processors 110 (e.g., Application Processors (APs)), a communication module 120, a Subscriber Identification Module (SIM) 124, a memory 130, a sensor module 140, an input device 150, a display 160, an interface 170, an audio module 180, a camera module 191, a power management module 195, a battery 196, an indicator 197, and a motor 198.

The processor 110 is capable of driving, for example, an operating system or an application program to control a plurality of hardware or software components connected to the processor 110, processing various data, and performing operations. The processor 110 may be implemented as, for example, a System on Chip (SoC). According to an embodiment, the processor 110 may further include a graphic processing unit (GPU) and/or an image signal processor. The processor 110 may also include at least part of the components shown in FIG. 1B, e.g., a cellular module 121. The processor 110 is capable of loading commands or data received from at least one of other components (e.g., a non-volatile memory) on a volatile memory, processing the loaded commands or data. The processor 110 is capable of storing various data in a non-volatile memory.

The communication module 120 may include the same or similar configurations as the communication interface 17 shown in FIG. 1A. For example, the communication module 120 is capable of including a cellular module 121, WiFi module 123, BLUETOOTH (BT) module 125, GNSS module 126 (e.g., a GPS module, Glonass module, Beidou module or Galileo module), NFC module 127, MST module 128, and Radio Frequency (RF) module 129.

The cellular module 121 is capable of providing a voice call, a video call, an SMS service, an Internet service, etc., through a communication network, for example. According to an embodiment, the cellular module 121 is capable of identifying and authenticating an electronic device 101 in a communication network by using a subscriber identification module (SIM) 124 (e.g., a SIM card). According to an embodiment, the cellular module 121 is capable of performing at least part of the functions provided by the processor 110. According to an embodiment, the cellular module 121 is also capable of including a communication processor (CP).

Each of the WiFi module 123, the BT module 125, the GNSS module 126, and the NFC module 127 is capable of including a processor for processing data transmitted or received through the corresponding module. The MST module 128 is capable of including a processor for processing data transmitted or received through the corresponding module. According to embodiments, at least part of the cellular module 121, WiFi module 123, BT module 125, GNSS module 126, NFC module 127, and MST module 128 (e.g., two or more modules) may be included in one integrated chip (IC) or one IC package.

The RF module 129 is capable of transmission/reception of communication signals, e.g., RF signals. The RF module 129 is capable of including a transceiver, a power amp module (PAM), a frequency filter, a low noise amplifier (LNA), an antenna, etc. According to another embodiment, at least one of the following modules: cellular module 121, WiFi module 123, BT module 125, GNSS module 126, NFC module 127, and MST module 128 is capable of transmission/reception of RF signals through a separate RF module.

The SIM module 124 is capable of including a card including a subscriber identification module (SIM) and/or an embodied SIM. The SIM module 124 is also capable of containing unique identification information, e.g., integrated circuit card identifier (ICCID), or subscriber information, e.g., international mobile subscriber identity (IMSI).

The memory 130 (e.g., memory 13 shown in FIG. 1A) is capable of including a built-in memory 132 or an external memory 134. The built-in memory 132 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 134 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 134 is capable of being connected to the electronic device 101, functionally and/or physically, through various interfaces.

The memory 130 is capable of storing payment information and a payment application serving as one of the application programs 14D. The payment information may refer to credit card numbers and PINs, corresponding to a credit card. The payment information may also include user authentication information, e.g., fingerprints, facial features, voice information, etc.

When the payment application is executed by the processor 110, it may enable the processor 110 to perform: an interaction with the user to make payment (e.g., displaying a screen to select a card (or a card image) and obtaining information (e.g., a card number) corresponding to a selected card (e.g., a pre-specified card) from payment information); and an operation to control magnetic field communication (e.g., transmitting the card information to an external device (e.g., a card reading apparatus) through the NFC module 127 or MST module 128). The following description provides detailed embodiments with operations of the components described above, referring to FIG. 1C to FIG. 17.

The sensor module 140 is capable of measuring/detecting a physical quantity or an operation state of the electronic device 101, and converting the measured or detected information into an electronic signal. The sensor module 140 is capable of including at least one of the following: a gesture sensor 140A, a gyro sensor 140B, an atmospheric pressure sensor 140C, a magnetic sensor 140D, an acceleration sensor 140E, a grip sensor 140F, a proximity sensor 140G, a color sensor 140H (e.g., a red, green and blue (RGB) sensor), a biometric sensor 140I, a temperature/humidity sensor 140I, an illuminance sensor 140K, and a ultraviolet (UV) sensor 140M. Additionally or alternatively, the sensor module 140 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 140 is capable of further including a control circuit for controlling one or more sensors included therein. In embodiments, the electronic device 101 is capable of including a processor, configured as part of the processor 110 or a separate component, for controlling the sensor module 140. In this case, while the processor 110 is operating in sleep mode, the processor is capable of controlling the sensor module 140.

The input device 150 is capable of including a touch panel 152, a (digital) pen sensor 154, a key 156, or an ultrasonic input unit 158. The touch panel 152 may be implemented with at least one of the following: a capacitive touch system, a resistive touch system, an infrared touch system, and an ultrasonic touch system. The touch panel 152 may further include a control circuit. The touch panel 152 may also further include a tactile layer to provide a tactile response to the user.

The (digital) pen sensor 154 may be implemented with a part of the touch panel or with a separate recognition sheet. The key 156 may include a physical button, an optical key, or a keypad. The ultrasonic input unit 158 is capable of detecting ultrasonic waves, created in an input tool, through a microphone 188, and identifying data corresponding to the detected ultrasonic waves.

The display 160 (e.g., the display 16 shown in FIG. 1A) is capable of including a panel 162, a hologram unit 164, or a projector 166. The panel 162 may include the same or similar configurations as the display 16 shown in FIG. 1A. The panel 162 may be implemented to be flexible, transparent, or wearable. The panel 162 may also be incorporated into one module together with the touch panel 152. The hologram unit 164 is capable of showing a stereoscopic image in the air by using light interference. The projector 166 is capable of displaying an image by projecting light onto a screen. The screen may be located inside or outside of the electronic device 101. According to an embodiment, the display 160 may further include a control circuit for controlling the panel 162, the hologram unit 164, or the projector 166.

The interface 170 is capable of including a high-definition multimedia interface (HDMI) 172, a universal serial bus (USB) 174, an optical interface 176, or a D-subminiature (D-sub) 178. The interface 170 may be included in the communication interface 17 shown in FIG. 1A. Additionally or alternatively, the interface 170 is capable of including a mobile high-definition link (MHL) interface, a secure digital (SD) card/multimedia card (MMC) interface, or an infrared data association (IrDA) standard interface.

The audio module 180 is capable of providing bidirectional conversion between a sound and an electronic signal. At least part of the components in the audio module 180 may be included in the input/output interface 15 shown in FIG. 1A. The audio module 180 is capable of processing sound information input or output through a speaker 182, a receiver 184, earphones 186, microphone 188, etc.

The camera module 191 refers to a device capable of taking both still and moving images. According to an embodiment, the camera module 191 is capable of including one or more image sensors (e.g., a front image sensor or a rear image sensor), a lens, an image signal processor (ISP), a flash (e.g., an LED or xenon lamp), etc.

The power management module 195 is capable of managing power of the electronic device 101. According to an embodiment, the power management module 195 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 196. The battery 196 takes the form of either a rechargeable battery or a solar battery.

The indicator 197 is capable of displaying a specific status of the electronic device 101 or a part thereof (e.g., the processor 110), e.g., a boot-up status, a message status, a charging status, etc. The motor 198 is capable of converting an electrical signal into mechanical vibrations, such as, a vibration effect, a haptic effect, etc. Although not shown, the electronic device 101 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 1C:
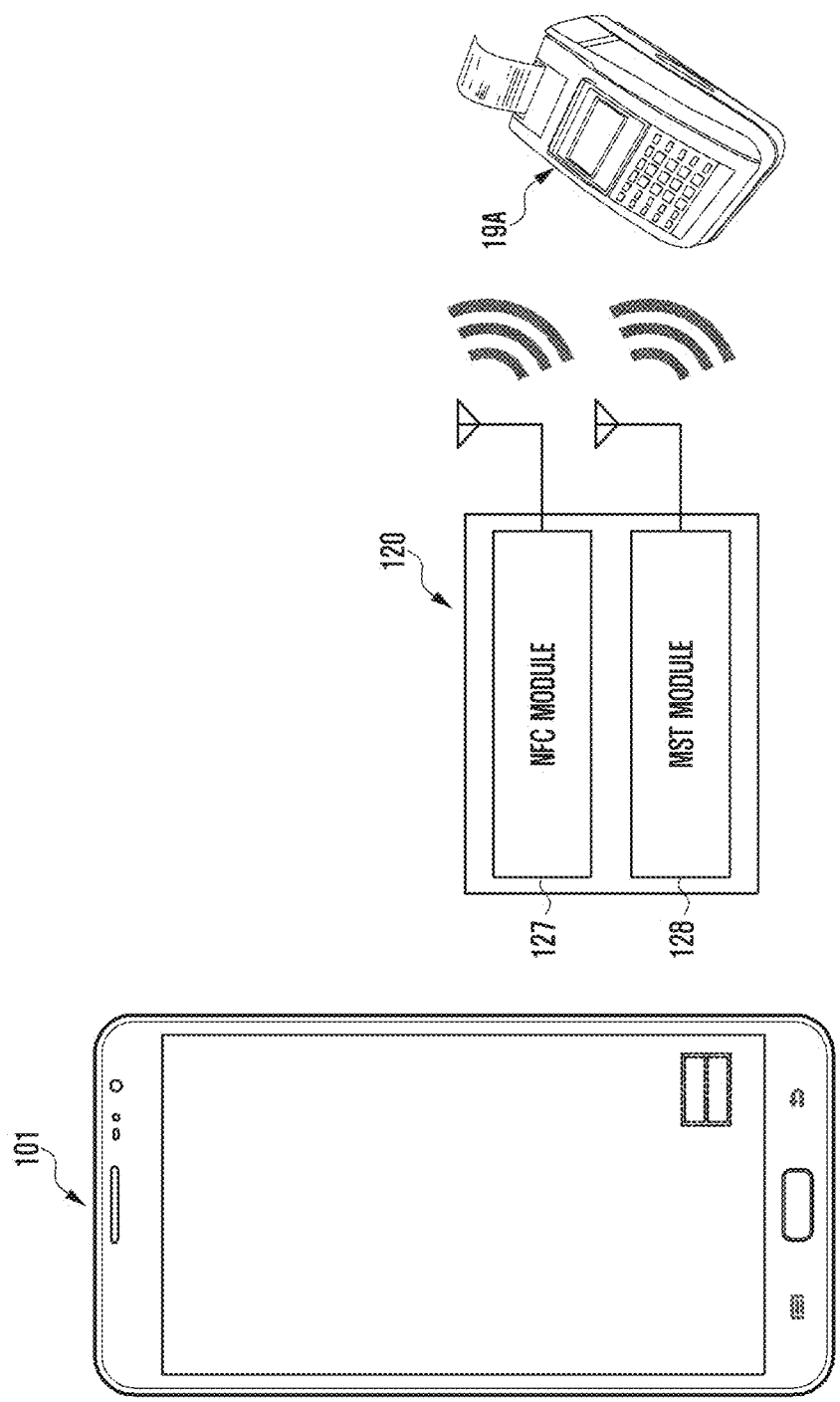
FIG. 1C is a block diagram showing a configuration of a handheld electronic device according to various embodiments of the present disclosure.

FIG. 1C is a block diagram showing a configuration of an electronic device according to various embodiments.

Referring to FIG. 1C, the electronic device 101 is capable of including a communication module 120. The electronic device 101 is capable of performing transmission/reception of data, calling function, media function, etc., with an external device, via the communication module 120.

The electronic device 101 transmits data via the communication module 120. The transmission data may be information stored in a storage module (e.g., a memory) included in the electronic device 101. The storage module may be built in the electronic device 101 or may refer to a storage space connected to the electronic device 101. The transmission data may be created from the stored information by a data creating module included in the electronic device 101.

The transmission data created by the data creating module may include security data or payment information. The security data may be created as data stored in the storage module is encrypted. The payment information may include primary account number (PAN), device account number (DAN), virtual credit card information, bank information number (BIN), card security code (CSC), card verification value (CVV) or cryptogram, which are stored in the storage module. For example, the communication module 120 is capable of including the data creating module.

In various embodiments, the electronic device 101 is capable of performing a payment function for purchasing products or services by using the communication module 120. According to a user's operation, the electronic device 101 performs transmission of payment information, thereby making payment for costs of products or services. Therefore, although a user does not have cash or a credit card, he/she holds his/her electronic device 101, such as a smartphone or tablet, to or near a payment receiving apparatus 19A, e.g., a credit card reading apparatus, corresponding to an external device shown in FIG. 1A, thereby simply making payment.

The electronic device 101 is capable of providing payment information, such as a credit card number, etc., to a card reading apparatus 19A. The electronic device 101 is capable of providing an authentication process (e.g., inputting a password, recognizing a fingerprint, etc.) in the process of payment. The electronic device 101 is capable of providing payment information to the payment receiving apparatus 19A via short-range communication such as NFC communication, MST communication, etc., and the card reading apparatus 19A is capable of making a payment based on the received payment information.

According to various embodiments, the communication module 120 is capable of including one or more sub-communication modules capable of offline payment. Examples of the sub-communication module are an NFC module 127 and MST module 128.

For example, a near field communication (NFC) module 127 is capable of supporting short-range wireless communication for transmitting data in bidirectional communication over a specified frequency band (e.g., 13.56 MHz), between devices with an NFC chip. The NFC module 127 may operate in a passive communication mode where it establishes a channel by electric power received through magnetic fields created by an external device, or in an active communication mode where it establishes a channel by directly creating magnetic fields.

The NFC module 127 is capable of operating according to a preset NFC signal period. When the NFC module 127 operates in a passive communication mode, the NFC signal period may be set to include only the passive communication interval. When the NFC module 127 operates in an active communication mode, the NFC signal period may be set to include the passive and active communication intervals.

For example, the MST module 128 may be a short-range wireless communication module capable of transmission of data in near field magnetic data stripe transmission (MST). MST is capable of creating pulses according to transmission data and converting the pluses into magnetic field signals. In order to read the received, transmission data, the card reading apparatus 19A allows the sensor (e.g., MST reader or header) to detect the converted magnetic field signals, and converts the detected magnetic fields signals into electrical signals to restore the transmission data.

The MST module 128 is capable of receiving control signals and payment information from a control circuit of the electronic device 101. The MST module 128 is converting the payment information into magnetic signals and transmitting the magnetic signals. For example, the MST module 128 is capable of producing magnetic field signals identical to those created when the magnetic stripe of the credit card is swiped through the card reading apparatus 19A. The payment information transmitted from the MST module 128 may be recognized by the card reading apparatus 19A which is generally used. In various embodiments, the MST module is capable of providing payment information to the card reading apparatus 19A via unidirectional communication. The configurations and operations of the MST module 128 will be described in detail, later, referring to FIG. 16.

The NFC module 127 and MST module 128 are only examples of the sub-communication module. It should be understood that they may also be implemented with other types of short-range communication.

The electronic device 101 is capable of transmitting magnetic field signals, e.g., NFC and MST signals, via the communication module 120, simultaneously or sequentially. The NFC module 127 and MST module 128 are capable of transmitting payment information to the payment receiving apparatus 19A, selectively, according to a specified schedule or signal period (e.g., 0.2 sec). The NFC module 127 and MST module 128 are capable of selectively operating in a specified time interval, thereby reducing power consumption according to transmission of signals and also preventing duplicate payments. When a user just holds the electronic device 101 up to or near a specified payment receiving apparatus without select a particular communication mode, the payment can be completed.

Figure 2A:
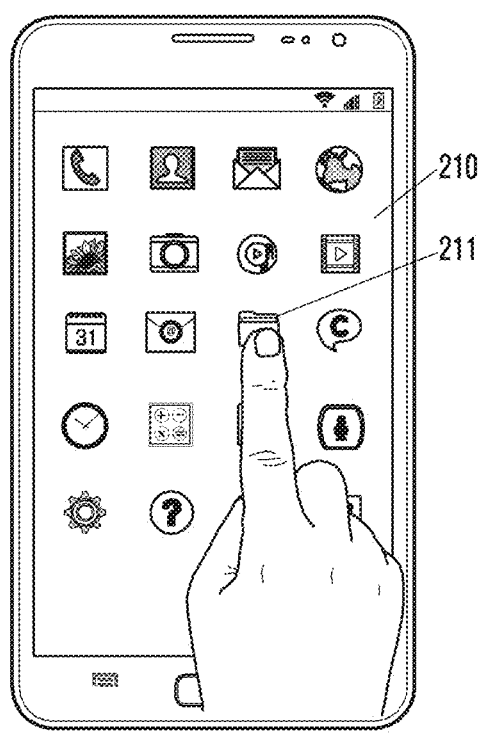
FIGS. 2A, 2B and 2C are diagrams that describe a method of setting a card to be used to make a payment from the screen of an electronic device, according to various embodiments of the present disclosure.
Figure 2B:
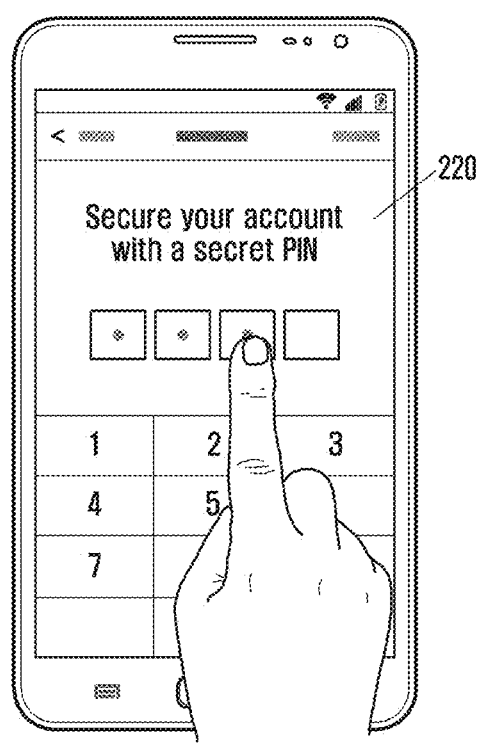
Figure 2C:
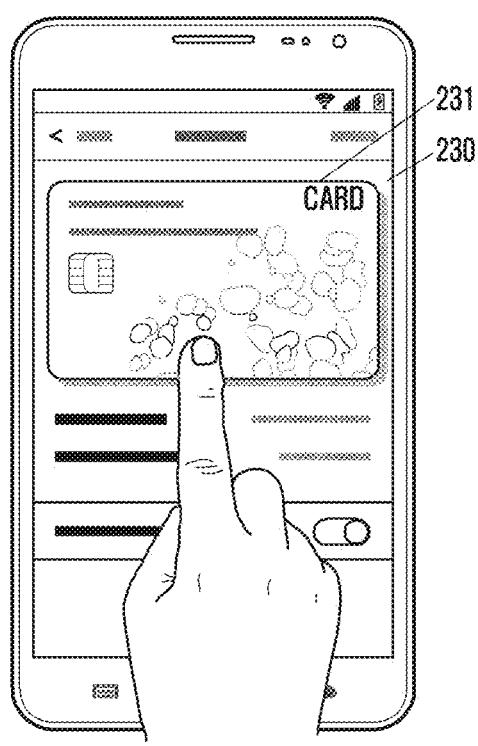

FIGS. 2A to 2C are diagrams that describe a method of setting a card to be used to make a payment from the screen of an electronic device, according to various embodiments of the present disclosure.

Referring to FIG. 2A, when a user inputs a gesture for selecting an object 211 (e.g., an icon) related to a payment application displayed on the screen 210 (e.g., the home screen) configuring at least part of the electronic device 200, the processor 110 is capable of receiving the user's input of selecting the object 211, via the input device 150.

Referring to FIG. 2B, the processor 110 is capable of executing a payment application stored in the memory 130, in response to the user's input of selecting the object 211. As the payment application is executed, the processor 110 is capable of controlling the display 160 to display an input screen 220 for entering an authentication code and an input screen for entering numbers, letters, symbols, etc. The processor 110 is capable of receiving an authentication code (e.g., a password, a pattern, etc.) input to the input screen, and determining whether the received authentication code matches with a stored authentication code. The stored authentication code may be stored in the built-in memory 132, an external memory 134, or an external device 19A. The stored authentication code may also be stored in an external device 19B or a server 19C which are connected to the electronic device 200 via a network 20B.

Referring to FIG. 2C, when the user's input authentication code matches with a stored authentication code (or the user is authenticated), the processor 110 is capable of displaying a screen 230 for selecting a card. The processor 110 is capable of receiving user inputs applied to the screen 230, e.g., user's gestures on the screen, such as tap, drag, swipe, etc., via the input device 150. The processor 110 is capable of controlling the display 160 to display the currently displayed card and other cards, in response to the user's input. The processor 110 is capable of receiving a user's input of selecting a card 231 on the screen 230, via the input device 150. The processor 110 is capable of determining the selected card 231 as a payment card in response to the selection. That is, the processor 110 is capable of determining the information regarding the selected card 231 as information to be transmitted to an external device through magnetic field communication.

FIGS. 3A to 3D are diagrams that describe a method of determining a card to be used to make a payment on a lock screen, according to various embodiments of the present disclosure.

Figure 3A:
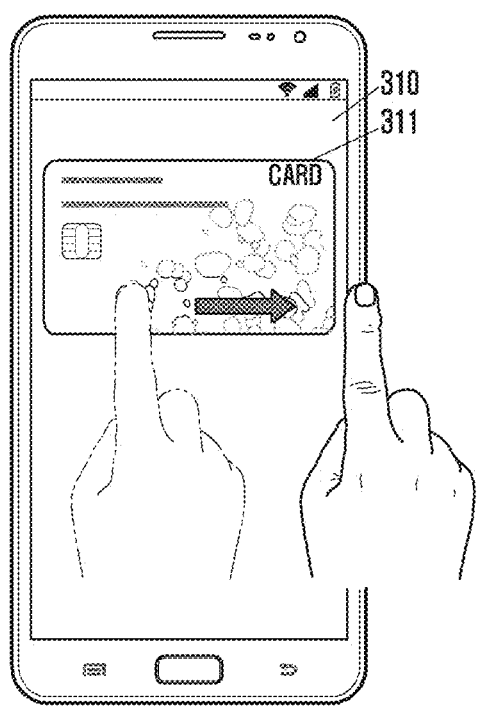
FIGS. 3A, 3B, 3C and 3D are diagrams that describe a method of determining a card to be used to make a payment on a lock screen, according to various embodiments of the present disclosure.

Referring to FIG. 3A, the processor 110 is capable of receiving a user instruction for showing (displaying) a screen on the display from the input device 150 or the sensor module 140 (e.g., a magnetic sensor 140D). The processor 110 is capable of controlling the display 160 to display a lock screen 310 in response to the user instruction. The lock screen 310 may further includes a card or card image 311. The card image may change from one card image, currently displayed on the screen, to another according to a user's inputs (e.g., gestures applied on the screen, such as, tap, drag, swipe, etc.).

Figure 3B:
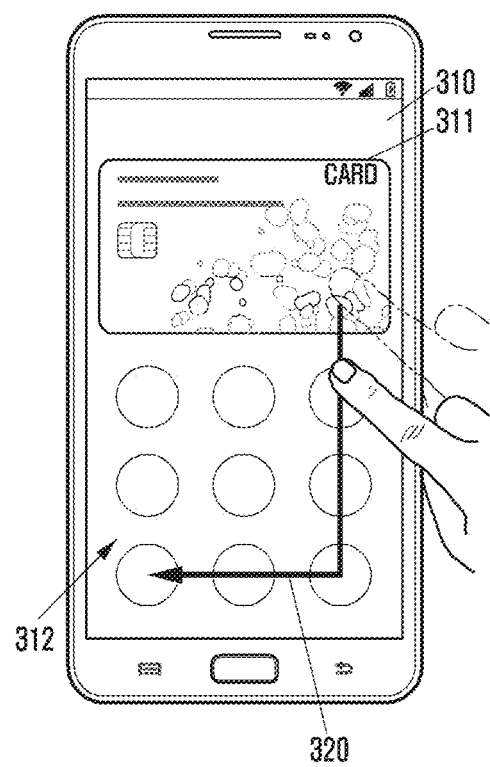

Referring to FIG. 3B, the lock screen 310 may include a card image 311 and a user input screen 312 for unlocking the lock screen. The user input screen 312 may be configured to include dots arranged in grid. The user input screen 312 may display an input area to which the user can apply various inputs. In order to unlock the lock screen 310 and make a payment, the user applies a gesture 320 to the lock screen 310 in such a way that he/she first touches the card image 311 with an object (e.g., a finger, a stylus pen, etc.), selects grid-arranged dots in order without losing the contact on the lock screen 310, and then releases the contact from the lock screen 310. Alternatively, the user applies a gesture to the lock screen 310 in such a way that he/she first touches the card image 311 with an object and draws a pre-defined symbol (e.g., the letter 'P' representing 'payment') within the area displaying the user input guide, thereby unlocking the lock screen and making a payment. As another embodiment, the user may draw a pre-defined symbol with an object to pass successively through at least part of the area of the lock screen 310 and the card image 311, thereby unlocking the lock screen and making a payment.

The processor 110 determines whether the detected gesture 320 satisfies an unlock condition (or a user authentication condition). When the processor 110 ascertains that the detected gesture 320 satisfies an unlock condition (or a user authentication condition), it is capable of unlocking the lock screen of the user device (e.g., handheld electronic device 101) and executing a payment application, thereby determining the touched card image 311 as a card to be used to make a payment.

Figure 3C:
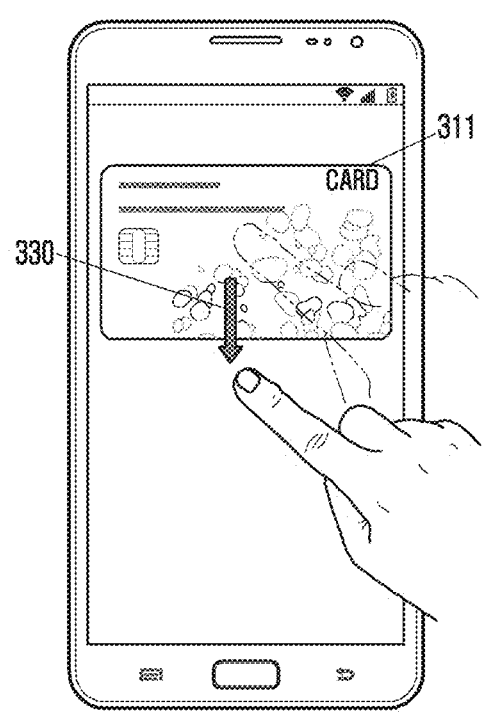

Referring to FIG. 3C, a user may apply a gesture 330 for unlocking the lock screen and making a payment to the lock screen in such a way that he/she first touches the card image 311 with an object and moves (drags) the card image 311 out of the screen, releasing the touch of the object off the lock screen 310. In response to the gesture 330, the processor 110 is capable of unlocking the lock screen of the handheld electronic device 101 and executing a payment application, thereby determining the touched card image 311 as a card to be used to make a payment.

Figure 3D:
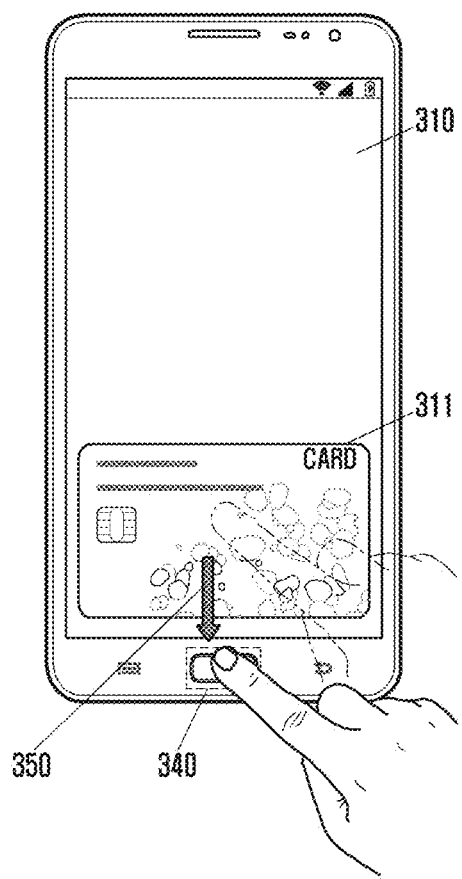

Referring to FIG. 3D, payment may be made based on a user's biometric information. For example, a user may apply a gesture 350 for unlocking the lock screen and making a payment to the lock screen in such a way that he/she first touches the card image 311 with the finger and locates the finger on the fingerprint detection area 340. The biometric sensor 140I (e.g., a fingerprint sensor) detects the user's fingerprint on the fingerprint detection area 340 and transfers the fingerprint information to the processor 110. The processor 110 determines whether the received fingerprint information matches with stored fingerprint information. When the processor 110 ascertains that the received fingerprint information matches with stored fingerprint information (i.e., the user is authenticated), it is capable of unlocking the lock screen of the handheld electronic device 101 and executing a payment application, thereby determining the touched card image 311 as a card to be used to make a payment. It should be understood that a user authentication method by using biometrics is not limited a fingerprint recognition, but may also be implemented by employing an iris recognition using a camera, an electrocardiogram (ECG) recognition using an ECG sensor, or a combination thereof.

Figure 4A:
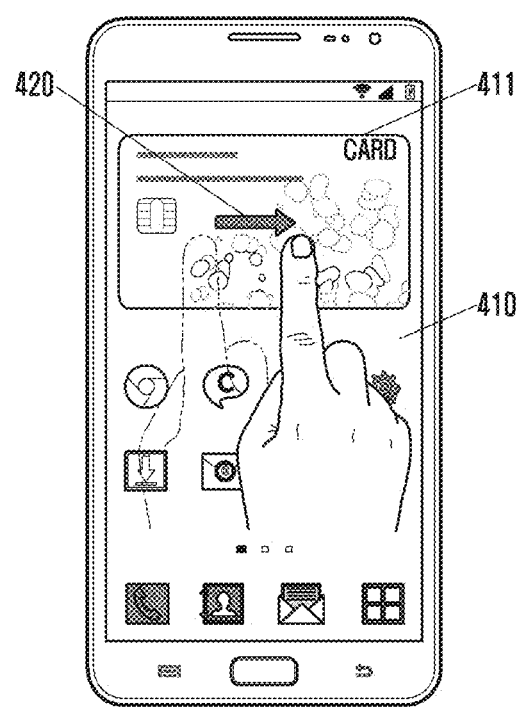
FIGS. 4A, 4B and 4C are diagrams that describe a method of determining a card to be used to make a payment on a widget screen, according to various embodiments of the present disclosure.
Figure 4B:
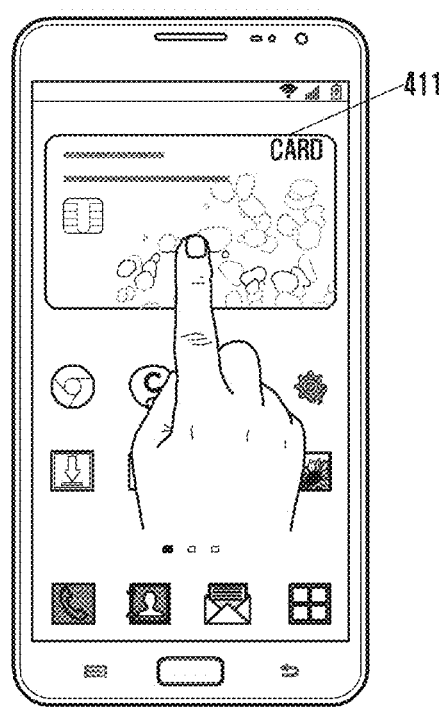
Figure 4C:
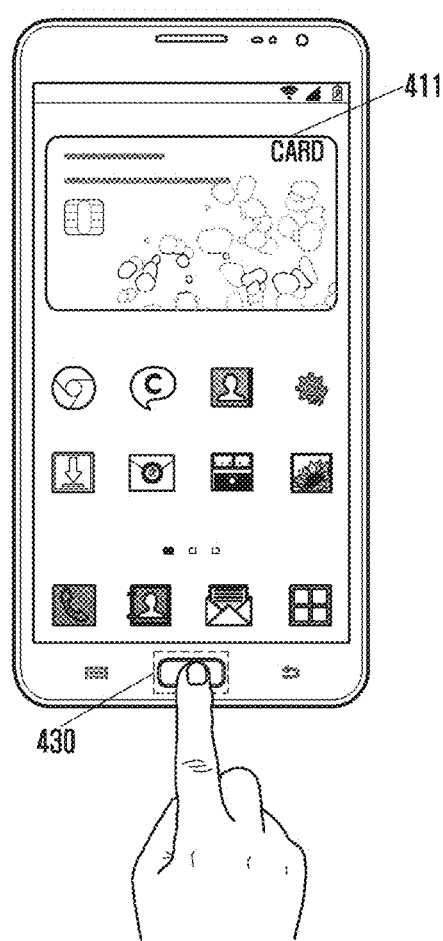

FIGS. 4A to 4C are diagrams that describe a method of determining a card to be used to make a payment on a widget screen, according to various embodiments of the present disclosure.

Referring to FIG. 4A, the display 160 shows a card image 411 as a widget screen on the screen 410. The card image may change from one card image, currently displayed on the screen, to another according to a user's input 420 (e.g., gestures applied on the screen, such as, tap, drag, swipe, etc.).

Referring to FIG. 4B, the processor 110 is capable of receiving a user's input of selecting a card image 411 via an input device 150 (e.g., a touch panel 152). In response to the user's input, the processor 110 is capable of determining the selected card image 411 as a card to be used to make a payment.

Referring to FIG. 4C, the biometric sensor 140I (e.g., a fingerprint sensor) detects the user's fingerprint on the fingerprint detection area 430 and transfers the fingerprint information to the processor 110. The processor 110 determines whether the received fingerprint information matches with stored fingerprint information. When the processor 110 ascertains that the received fingerprint information matches with stored fingerprint information (i.e., the user is authenticated), it is capable of determining the displayed card image 411 as a card to be used to make a payment. It should be understood that a user authentication method by using biometrics is not limited to fingerprint recognition, but may also be implemented by employing an iris recognition using a camera, an electrocardiogram (ECG) recognition using an ECG sensor, or a combination thereof.

FIGS. 5A to 5D are diagrams that describe a method of controlling creation or stoppage of magnetic field signals for payment, according to various embodiments of the present disclosure.

Figure 5A:
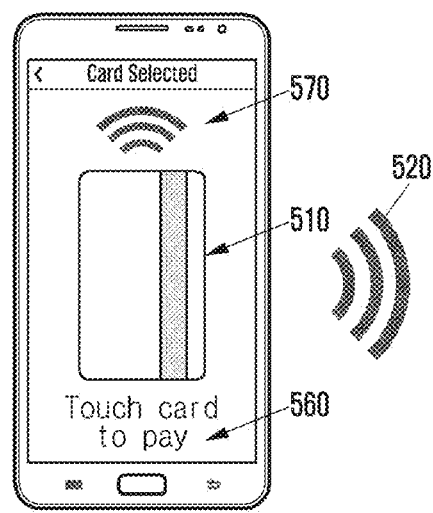
FIGS. 5A, 5B, 5C and 5D are diagrams that describe a method of controlling creation or stoppage of magnetic field signals for payment, according to various embodiments of the present disclosure.

Referring to FIG. 5A, the processor 110 is capable of controlling the display 160 to show a card image 510 determined as a card to be used to make a payment. The processor 110 is capable of controlling the display 160 to further display a guide message 560 to proceed with payment. The processor 110 is capable of determining whether the NFC module 127 is activated. When the processor 110 ascertains that the NFC module 127 is activated, it maintains the current state of the NFC module 127. When the processor 110 ascertains that the NFC module 127 is not activated, it activates the NFC module 127. The processor 110 is capable of determining whether the microphone 188 is activated. When the processor 110 ascertains that the microphone 188 is activated, it maintains the current state of the microphone 188. When the processor 110 ascertains that the microphone 188 is not activated, it activates the microphone 188.

The processor 110 is capable of obtaining card information regarding the card 510 from the memory 130. The card information may be a card number or a permanent or temporary number or information related to the card. For example, an example of the temporary information may be information (e.g., token) received from a server of a banking agency. The information received from a banking agency may be comprised of different tokens, with respect to the same card, according to payment methods (e.g., NFC payment, MST payment, etc.). At least part of the information or number related to the card may be created in the electronic device 101. For example, the electronic device 11 shown in FIG. 1A may also obtain at least part of the information or number related to the card may be create from an external device 19A or 19B or a sever 19C (e.g., a server of a banking agency). The card information stored in the memory 130 may be automatically removed after a preset period of time has elapsed from the completion of payment.

The processor 110 is capable of controlling a magnetic field communication module (e.g., NFC module 127 or MST module 128) to carry the obtained information on the magnetic field signal 520. For example, after the card image 510 is determined as a card to be used to make a payment, the operation mode of the NFC module 127 may be set to a mode for detecting a card reading apparatus for NFC, e.g., a polling mode. When a feedback signal (e.g., a ping signal) is received from a card reading apparatus in a polling mode, the NFC module 127 is capable of changing the operation mode from the polling mode to a mode for transmitting card information, e.g., a card mode. When the operation mode of the NFC module is set to a card mode, the card reading apparatus is capable of reading card information from the NFC module. For example, when a feedback signal (e.g., a ping signal) is not received from a card reading apparatus in a polling mode, the MST module 128 is capable of creating an MST signal for payment. As another example, after the card image 510 is determined as a card to be used to make a payment, an MST signal for payment is first created. At this moment, when a ping signal is received, the creation of an MST signal is stopped and the operation mode of the NFC module 127 is switched to a card mode, so that the NFC module 127 can provide information for payment to the card reading apparatus. As another embodiment, after the processor 110 determines the card image 510 as a card to be used to make a payment, an MST signal for proceeding with payment is created and simultaneously the mode of the NFC module 127 is switched to a polling mode to detect a card reading apparatus (Ping) for NFC. Alternatively, creating an MST signal and detecting a feedback signal (Ping) as the mode of the NFC module 127 is switched to a polling mode are performed in order. When a feedback signal (Ping) for NFC is received from the card reading apparatus, creation of an MST signal is stopped and the operation mode of the NFC module 127 is switched to a card mode, so that the NFC module 127 can provide information for payment to the card reading apparatus. On the contrary, when a feedback signal (Ping) is not received, payment is made through the MST signal.

The processor 110 determines whether the state of the handheld electronic device 101 satisfies a condition for initiating creation of a preset MST signal. When the processor 110 ascertains that the state of the handheld electronic device 101 satisfies a condition for initiating creation of a preset MST signal, it is capable of controlling the MST module 128 to create an MST signal. For example, 1) when an electronic device is in a stationary state or 2) when an electronic device is in a stationary state as the user grips it, an MST signal may be created. The stationary state may refer to a state when the handheld electronic device 101 remains stationary, in at least one of the horizontal and vertical dictions of magnetic fields created in an RF module (e.g., a coil antenna), included in the handheld electronic device 101, for performing MST payment. When the processor 110 ascertains that an acceleration obtained by the acceleration sensor 140E is within a preset threshold, it is capable of determining that the handheld electronic device 101 remains stationary. The processor 110 is capable of determining whether the user grips the handheld electronic device 101 via the grip sensor 140F. According to another embodiment, the condition for initiating creation of an MST signal may be a user input applied to the input device 150. For example, when a user applies a gesture, such as taping, dragging or swiping, to a payment card 510, the processor 110 detects the gesture and controls the MST module 128 to create an MST signal.

According to various embodiments, when an MST signal is created, the processor 110 is capable of controlling the display 160 to display, in a directional antenna wave form 570, a guide to inform the user of the creation and location of the MST signal.

MST signals may be created repeatedly. When a state of the handheld electronic device 101 satisfies a condition for stopping creation of an MST signal, creating MST signals may be stopped. For example, when a preset period of time has elapsed from a time point that an MST signal starts to be created, the processor 110 may stop creating the MST signal. As another example, when the processor 110 detects the handheld electronic device 101 in movement (e.g., when an acceleration of the handheld electronic device 101 obtained by the acceleration sensor 140E is greater than the threshold), it may stop creating the MST signal. As another example, the processor 110 receives audio information via the microphone 188 and extracts characteristic information from the received audio information. The processor 110 determines whether the extracted characteristic information corresponds to that of a stored payment completion sound (e.g., a sound produced when a receipt is output from a card reading apparatus). When the processor 110 ascertains that the extracted characteristic information corresponds to that of a stored payment completion sound, it may stop creating an MST signal. As another example, the processor 110 is capable of receiving and displaying a message representing payment approval from a server 19C (e.g., a server of a banking agency) via a communication module 120 (e.g., a cellular module 121 or a WiFi module 123). The processor 110 may stop creating an MST signal in response to the reception of the payment approval message.

While an MST signal is created periodically, the processor 110 is capable of operating the handheld electronic device 101 in low power consumption mode. In low power consumption mode, the processor 110 is capable of controlling the display 160 to: display off; decrease the brightness of the screen; control the contrast of the screen; or show a card by displaying on part of the area of the screen. The processor 110 is capable of terminating a function or application that is running regardless of payment, operating the function or application in a relatively low performance, or altering the execution priority. In low power consumption mode, the processor 110 is capable of altering the period of creation of an MST signal. For example, the processor 110 may create an MST signal at a period of 0.2 sec in general mode and at a period of 0.5 sec in low power consumption mode.

Figure 5B:
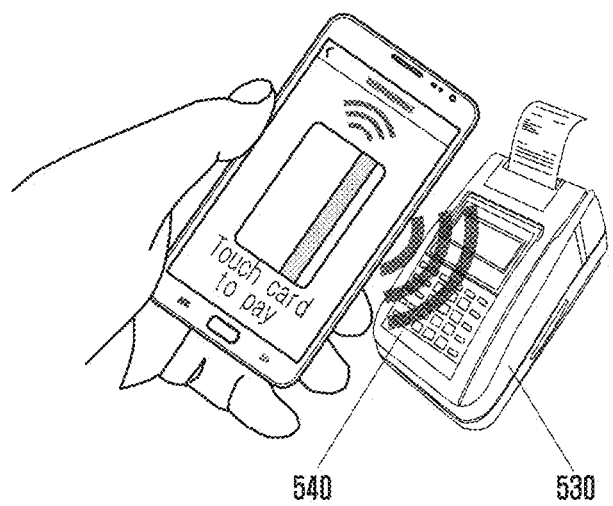

Referring to FIG. 5B, when the processor 110 recognizes that the 'handheld electronic device 101 is near the card reading apparatus 530' as an MST signal creation-initiation condition, it is capable of creating an MST signal 540. For example, the processor 110 recognizes a magnetic field produced by a card reading apparatus 530 (e.g., magnetic materials (body) located at at least part of the card reading apparatus 530) via a magnetic sensor 140D, and determines that the handheld electronic device 101 is near the card reading apparatus 530. The magnetic materials (body) producing magnetic fields may be located inside the card reading apparatus 530 or attached onto an outer surface of the card reading apparatus 530 in the form of sticker. When the processor 110 recognizes that the handheld electronic device 101 is far away from the card reading apparatus 530 (e.g., the intensity of the magnetic field is less than a threshold), it may stop creating an MST signal 540.

According to various embodiments, the card reading apparatus 530 may be equipped with an NFC tag. The NFC tag may be attached onto the outside of the card reading apparatus 530 in the form of tag, or may be located inside the card reading apparatus 530. The processor 110 is capable of receiving a tag-related NFC signal from the NFC tag via the NFC module 127. The processor 110 is capable of processing the received, tag-related NFC signal and recognizing that the received signal contains identification information representing that a corresponding device (i.e., a device with an NFC tag) is a card reading apparatus. When the received signal contains identification information, the processor 110 recognizes that the handheld electronic device 101 is near the card reading apparatus 530 and controls the MST module 128 to create an MST signal.

According to various embodiments, the processor 110 is capable of receiving a feedback signal (e.g., Ping) of a device for NFC from the NFC module 127. The processor 110 is capable of processing the received feedback signal and recognizing that the feedback signal contains identification information representing that the card reading apparatus is an NFC reader. When the identification information is contained in the feedback signal, the processor 110 is capable of recognizing that the handheld electronic device 101 is near a card reading apparatus that can make a payment via NFC communication, and controlling the NFC module 127 to switch the operation mode to a card mode.

Figure 5C:
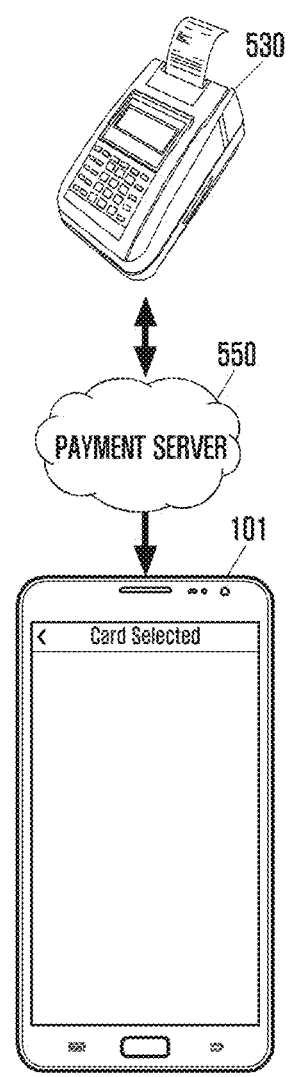

Referring to FIG. 5C, the card reading apparatus 530 is capable of receiving card information via magnetic field signals (NFC signals or MST signals), and transmitting the card information to a payment server 550 to request payment for costs. The payment server 550 determines whether to approve payment. When the payment server 550 determines to approve payment, it performs the payment process and returns the payment process result to the card reading apparatus 530. The payment server 550 is also capable of transmitting the payment process result (e.g., a payment completion message) to the handheld electronic device 101. When receiving the payment completion message, the handheld electronic device 101 is capable of stop creating a magnetic field signal (an NFC signal or MST signal).

Figure 5D:
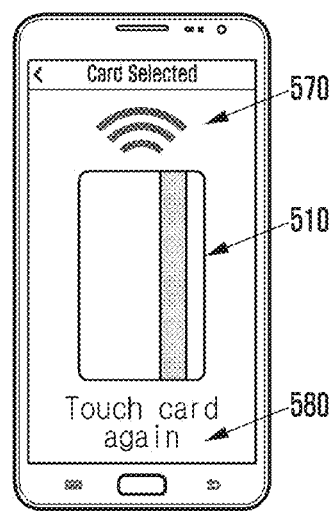

According to various embodiments, the processor 110 is capable of recognizing failure of payment, cooperating with the communication module 120. For example, when the processor 110 has not received a payment process result or has received a payment process result indicating that the payment is not approved, from a cellular module 121 or a WiFi module 123, it may recognize that the payment has failed. Therefore, as shown in FIG. 5D, the processor 110 is capable of controlling the display 160 to display a guide message 580 to inform the user of requesting a further payment attempt. According to another embodiment, the guide message may be notified in various methods, e.g., by using a feedback unit of an electronic device, operating in audible mode, tactile mode, visual mode, etc. Examples of the feedback unit are indicators for outputting a sound, vibration, or light (or LED).

Figure 6:
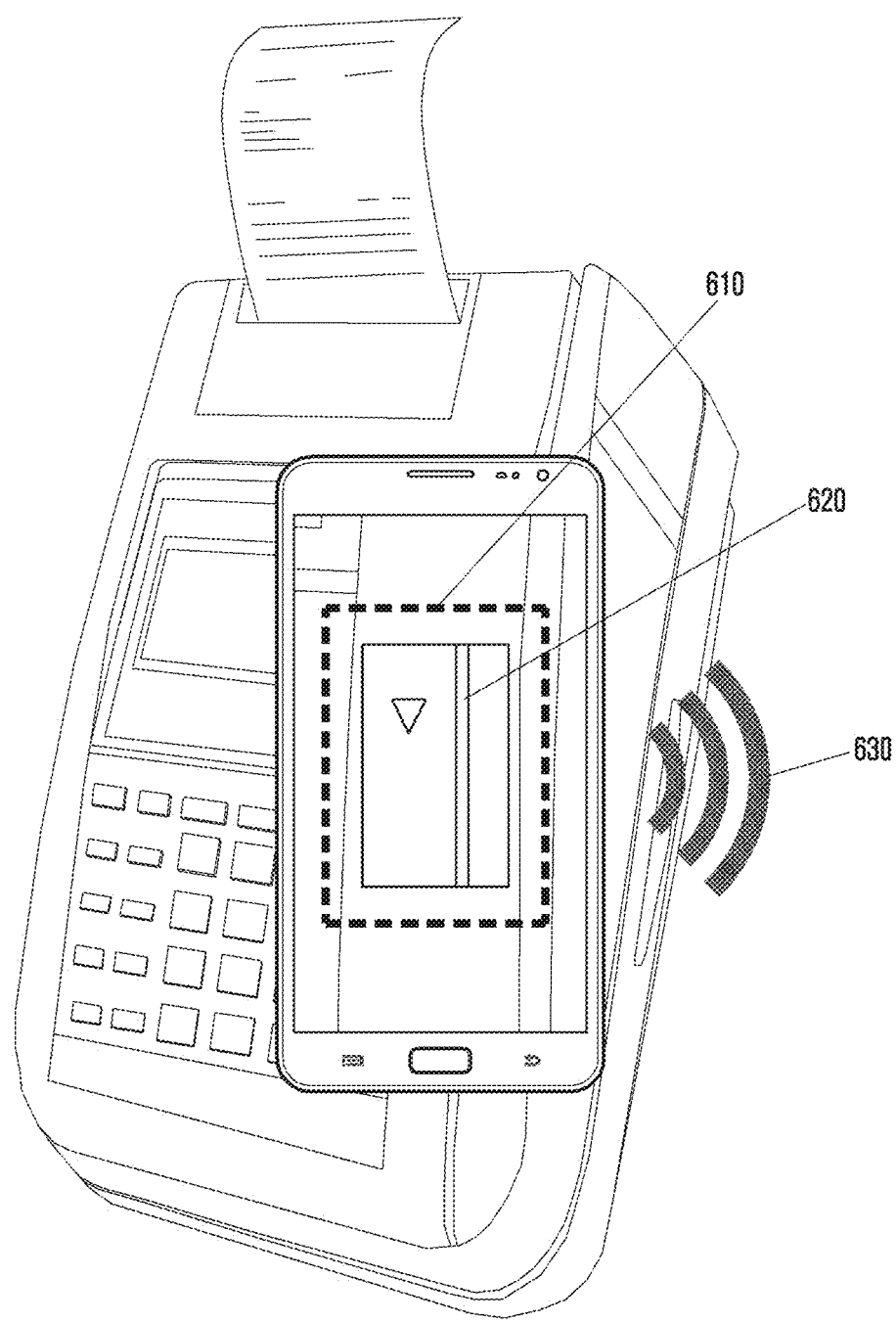
FIG. 6 is a diagram that describes a method of creating an MST signal using a camera, according to various embodiments of the present disclosure.

FIG. 6 is a diagram that describes a method of creating an MST signal using a camera, according to various embodiments of the present disclosure.

Referring to FIG. 6, the processor 110 is capable of controlling the display 16 to show a guide 610 on an image that is taken by the camera module 191 and displayed on the display 160. The processor 110 extracts part of the area of the guide 610 in the taken image and determines whether the extracted part includes a predefined shape 620. Examples of the predefined shape are a letter, symbol, image, etc. representing a location of a header or a card shape. When the processor 110 ascertains that the extracted part include a predefined shape 620, it may control the MST module 128 to create an MST signal 630.

According to various embodiments, the processor 110 is capable of transmitting the taken image or the extracted part to an external device via the communication module 120 (e.g., a WiFi module 123 or a BT module 125). Examples of the external device are various handheld electronic devices that differ from the handheld electronic device 101, such as tablets, smartphones, wearable devices, etc. An example of the wearable devices is a smart watch. The external device is capable of transmitting a payment command signal to the handheld electronic device 101, in response to the reception of taken image or the extracted part. The processor 110 receives the payment command signal from the external device via the communication module 120 and controls the MST module 128 to create an MST signal in response to the reception of the payment command signal.

According to various embodiments, when the processor 110 ascertains that the extracted part includes a predefined shape, it is capable of transmitting a payment request signal to an external device via the communication module 120 (e.g., a WiFi module 123 or a BT module 125). The processor 110 controls the MST module 128 to create an MST signal in response to the payment command signal that is received via the communication module 120 from the external device.

Figure 7A:
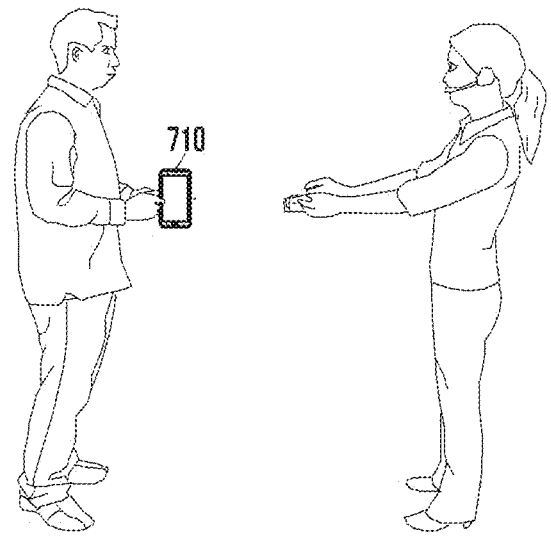
FIGS. 7A, 7B and 7C are diagrams that describe a method of creating an MST signal using a plurality of user terminals, according to various embodiments of the present disclosure.
Figure 7B:
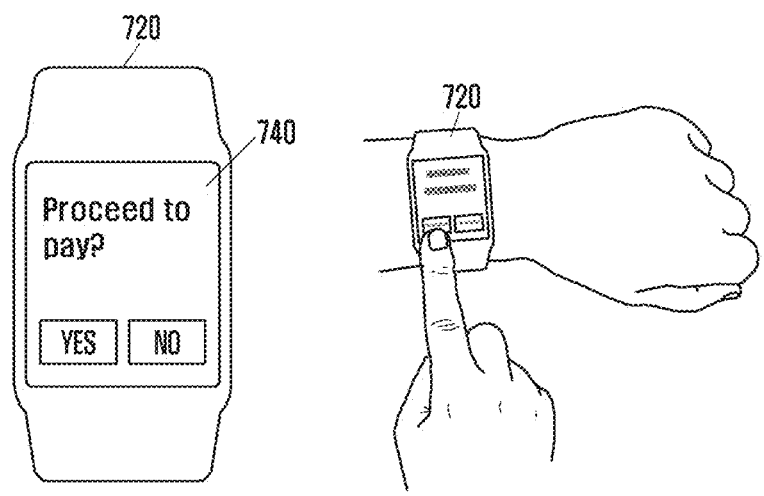
Figure 7C:
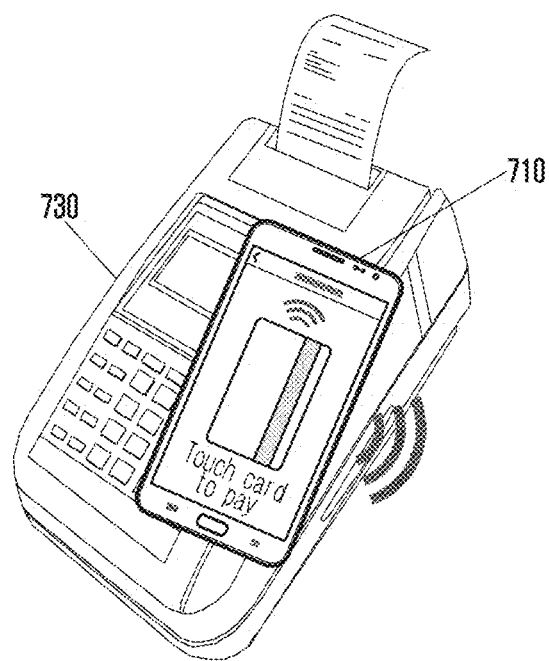

FIGS. 7A to 7C are diagrams that describe a method of creating an MST signal using a plurality of user terminals, according to various embodiments of the present disclosure.

Referring to FIG. 7A, a user may hand over his/her smartphone 710 (e.g., handheld electronic device 101) to other person (e.g., casher) to make a payment.

Referring to FIG. 7B, after the user checks that the other person holds the smartphone 710 to the card reading apparatus, the user may input a command for payment via the smart watch 720. For example, when the smartphone 710 recognizes proximity to the card reading apparatus, it is capable of transmitting a payment request message to the smart watch 720. When the smart watch 720 receives the payment request message, it displays a screen 740 to process a payment command and receives a user's input for payment. The smart watch 720 is capable of transmitting a payment command signal to the smartphone 710, based on the user's input.

Referring to FIG. 7C, when receiving the payment command signal from the smart watch 720, the smartphone 710 is capable of transmitting an MST signal with the card information to the card reading apparatus 730.

Figure 8A:
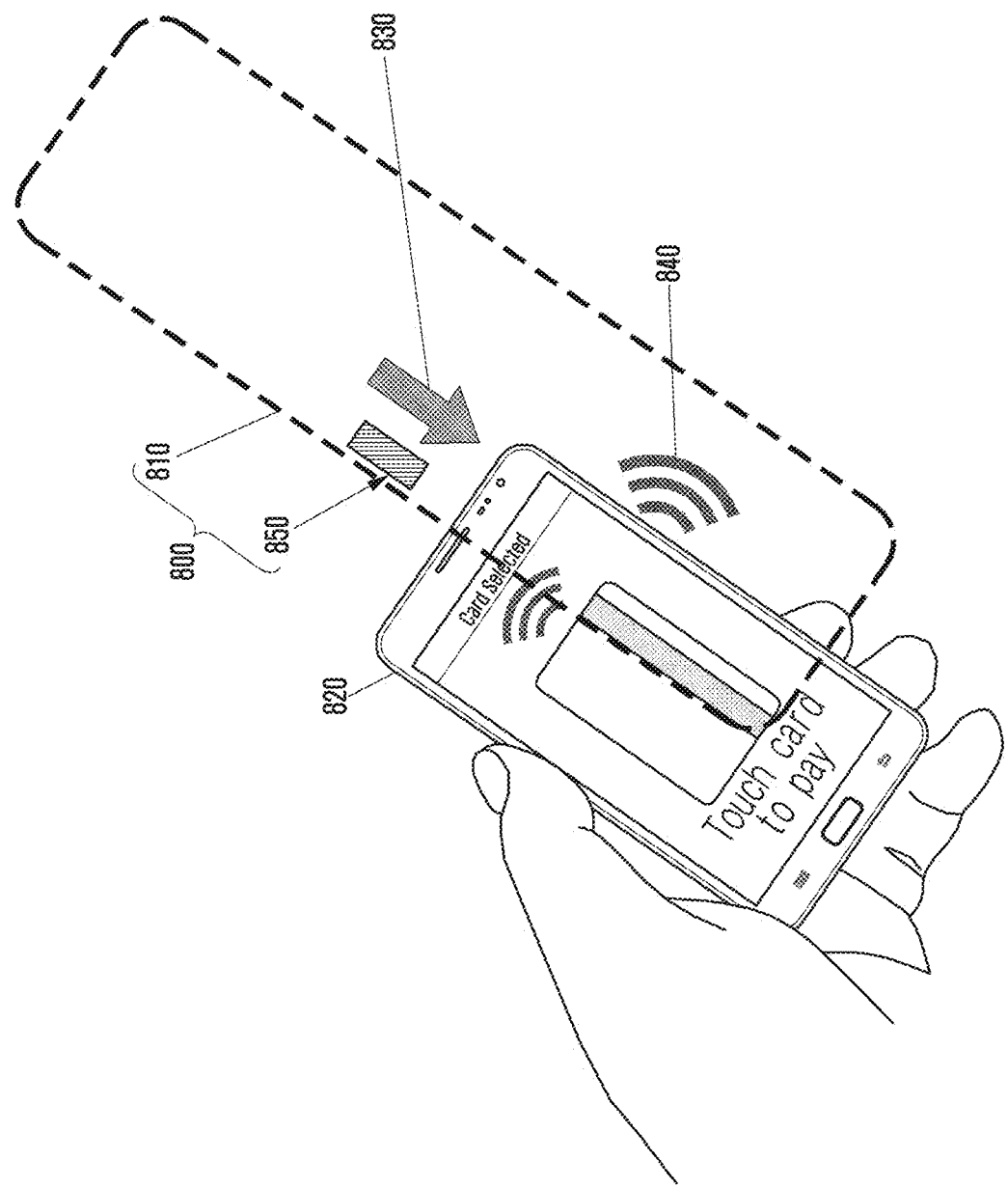

FIGS. 8A and 8B are diagrams that describe a method of creating an MST signal in response to a particular gesture applied to a device, according to various embodiments of the present invention.

Referring to FIG. 8A, reference number 800 of a card reading apparatus is to show a rail 810 over which a magnetic card is swiped and a location of a header 850 for receiving magnetic field information. The user may make a gesture 830 moving the smartphone 820 along the rail 810 on which the header 850 is located as if he/she swipes the credit card over the rail 810. The smartphone 820 recognizes the gesture 830 as an MST signal creation-initiation condition by the sensor (e.g., acceleration sensor 140E), and creates an MST signal 840 in response to the gesture 830. According to various embodiments, examples of the gesture 830 are motions of the smartphone performed in the vicinity of a card reading apparatus as shown in FIG. 8B, e.g., swinging in circle, shaking up and down, swiping left and right, etc. When the MST signal is created, a guide is shown on the display as shown in FIG. 8B.

FIGS. 9A to 9D are diagrams that describe a method of re-creating an MST signal, according to various embodiments of the present disclosure.

Figure 9A:
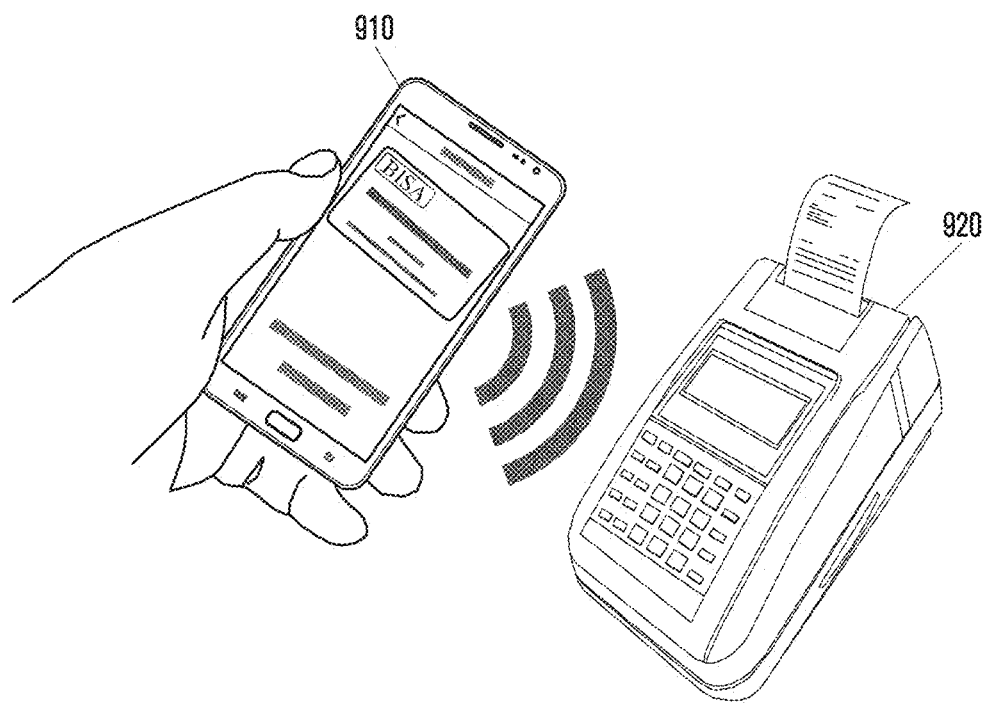
FIGS. 9A, 9B, 9C and 9D are diagrams that describe a method of re-creating an MST signal, according to various embodiments of the present disclosure.

Referring to FIG. 9A, the smartphone 910 is capable of transmitting an MST signal to the card reading apparatus 920.

Figure 9B:
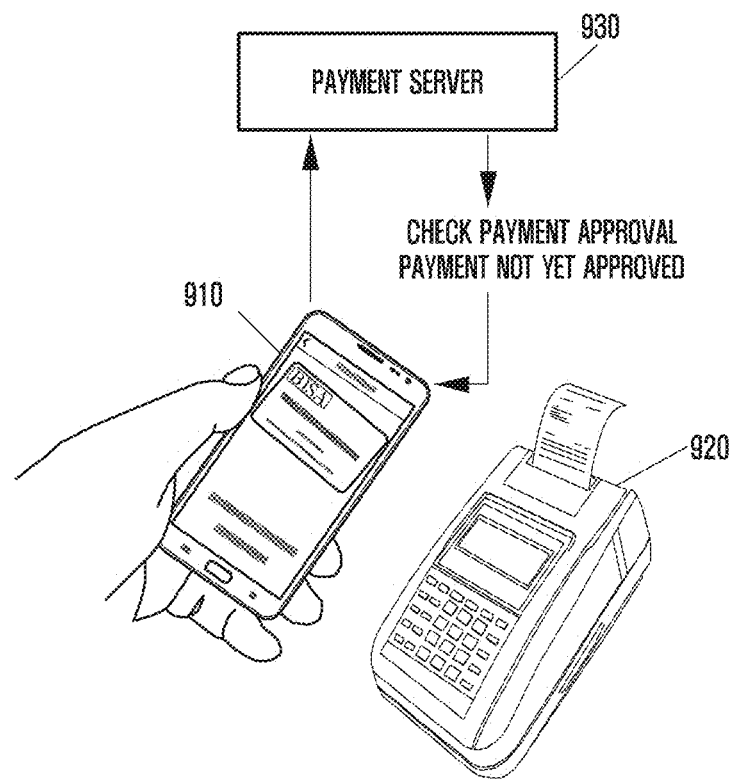

Referring to FIG. 9B, after stopping transmission of the MST signal, the smartphone 910 may transmit, to the payment server 930, a request message for checking whether the payment server 930 approves payment. The smartphone 910 is capable of receiving, from the payment server 930, a message indicating a condition as to whether the payment server 930 approves payment.

Figure 9C:
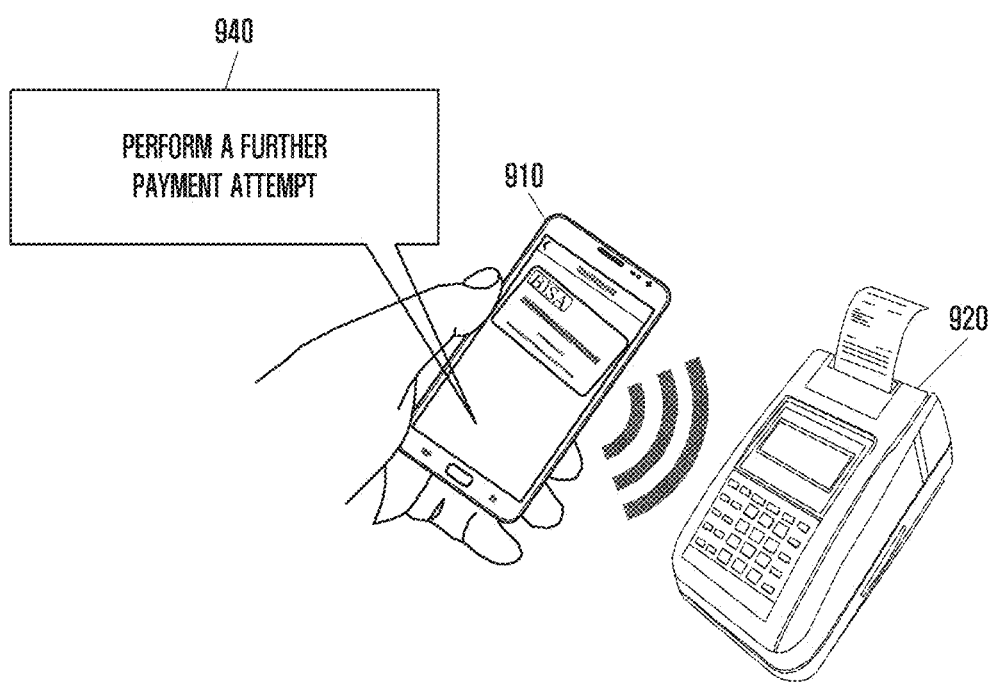

Referring to FIG. 9C, when payment has not been approved, the smartphone 910 provides the user with a guide 940 for the user to perform a further payment attempt, and re-transmits an MST signal.

Figure 9D:
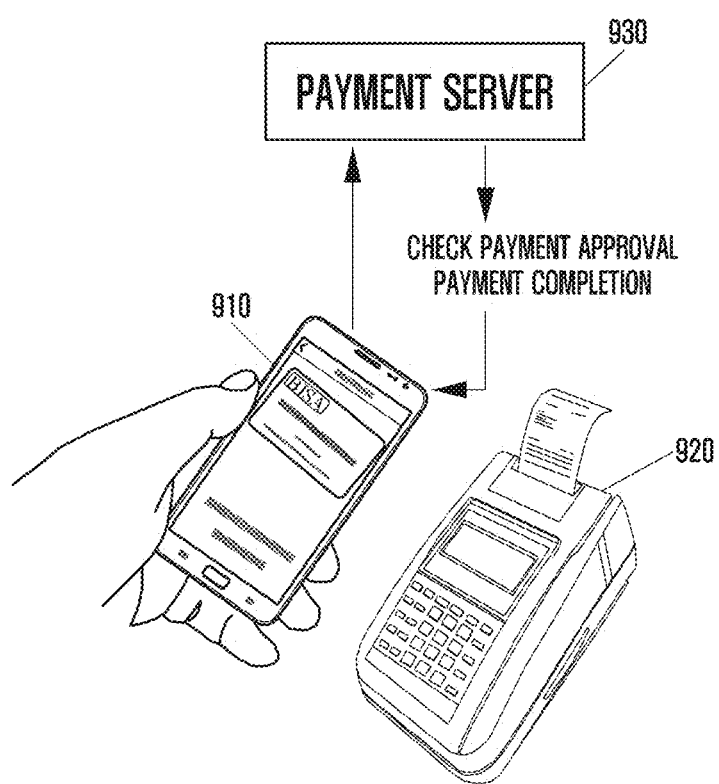

Referring to FIG. 9D, after stopping transmission of the MST signal again, the smartphone 910 is capable of re-checking whether payment is approved, via the payment server 930.

FIG. 10 is a flow diagram that describes a payment method according to a first embodiment of the present invention.

Referring to FIG. 10, the processor 110 is capable of controlling the display 160 to display a card selection screen in operation 1010.

The processor 110 is capable of checking whether the user is authenticated in operation 1015. When the processor 110 ascertains that the user is not authenticated in operation 1015, it performs a corresponding function, not a payment function.

When the processor 110 ascertains that the user is authenticated in operation 1015, it is capable of storing the current state of the NFC function in the memory 130 in operation 1020.

When the current state of the NFC function is an 'inactive state,' the processor 110 is capable of activating the NFC function in operation 1025. That is, the processor 110 is capable of commanding the power management to supply power to the NFC module 127. In this case, the NFC module 127 is capable of receiving a magnetic field signal (e.g., Ping).

The processor 110 is capable of controlling the display 160 to show an object (e.g., an image of a card) related to a card that has been used for payment or a preset card in operation 1030.

The processor 110 is capable of determining whether a user input for selecting one of the payment cards is created (e.g., a user input is received from the input device 150) in operation 1035. When the processor 110 ascertains that a user input for selecting one of the payment cards is not created in operation 1035, it determines the preset card and/or a card that has been used for payment as a card to be used to make a payment, and then proceed with the following operation 1045.

When the processor 110 ascertains that a user input for selecting one of the payment cards is created in operation 1035, it may determine a card selected by the user input (e.g., a card altered by the user input, not the preset card or a card that has been used for payment, or a plurality of cards selected by the user input) as a card to be used to make a payment in operation 1040, and then proceeds with the following operation 1045. The selected plurality of cards may further include new cards, including the preset card and the card that has been used for payment.

The processor 110 is capable of determining whether to receive a feedback signal (e.g., Ping) from an NFC reader (e.g., a card reading apparatus with an NFC module) via the NFC module 127 in operation 1045. When the processor 110 ascertains that it has received a feedback signal (e.g., Ping) in operation 1045, it switches the operation mode of the NFC module 127 to a card mode to provide card information for payment to the card reading apparatus in operation 1050, and proceeds with the following operation 1080 (1075).

When the processor 110 ascertains that it has not received a feedback signal (e.g., Ping), since the adjacent card reading apparatus is not equipped with an NFC function, in operation 1045, it determines whether the state of the handheld electronic device 101 (or user terminal) satisfies an MST signal creation-initiation condition in operation 1055. When the processor 110 ascertains that the state of the handheld electronic device 101 (or user terminal) does not satisfy an MST signal creation-initiation condition in operation 1055, it returns to operation 1045.

When the processor 110 ascertains that the state of the handheld electronic device 101 (or user terminal) satisfies an MST signal creation-initiation condition in operation 1055, it controls the MST module 128 to periodically create an MST signal with information regarding a payment card in operation 1060. In addition, the processor 110 may also perform a function for saving electric power. Examples of the case where the state of the handheld electronic device 101 (or user terminal) satisfies an MST signal creation-initiation condition are a case where the handheld electronic device 101 recognizes presence of a card reading apparatus via magnetic materials, a case where the processor recognizes that the handheld electronic device 101 is in a stationary state, a case where the processor recognizes a user input for proceeding with a payment process, etc.

After that, the processor 110 determines whether the state of the handheld electronic device 101 (or user terminal) satisfies a condition for stopping creation of an MST signal in operation 1065. When the processor 110 ascertains that the state of the handheld electronic device 101 (or user terminal) does not satisfy a condition for stopping creation of an MST signal in operation 1065, it outputs (displays) a guide for the user to perform a further payment attempt in operation 1070, and returns to operation 1045.

When the processor 110 ascertains that the state of the handheld electronic device 101 (or user terminal) satisfies a condition for stopping creation of an MST signal in operation 1065, it controls the MST module 128 to stop creating an MST signal in operation 1075. Examples of the case where the state of the handheld electronic device 101 (or user terminal) satisfies a condition for stopping creation of an MST signal are a case where the processor receives a payment completion message from a payment server, a case where the processor recognizes an elapse of a preset period of time from a time point when an MST signal starts to be created, a case where the intensity of the detected magnetic field is less than a threshold, a case where the processor recognizes that the handheld electronic device is moving, a case where the processor detects a payment completion, a case where the processor recognizes a user input for terminating a payment process, etc.

After that, the processor 110 checks the stored, current state of the NFC function. When the processor 110 ascertains that the current state of the NFC function, stored before payment, is 'inactive', it may alter the NFC function to be 'inactive' in operation 1080.

Figure 11:
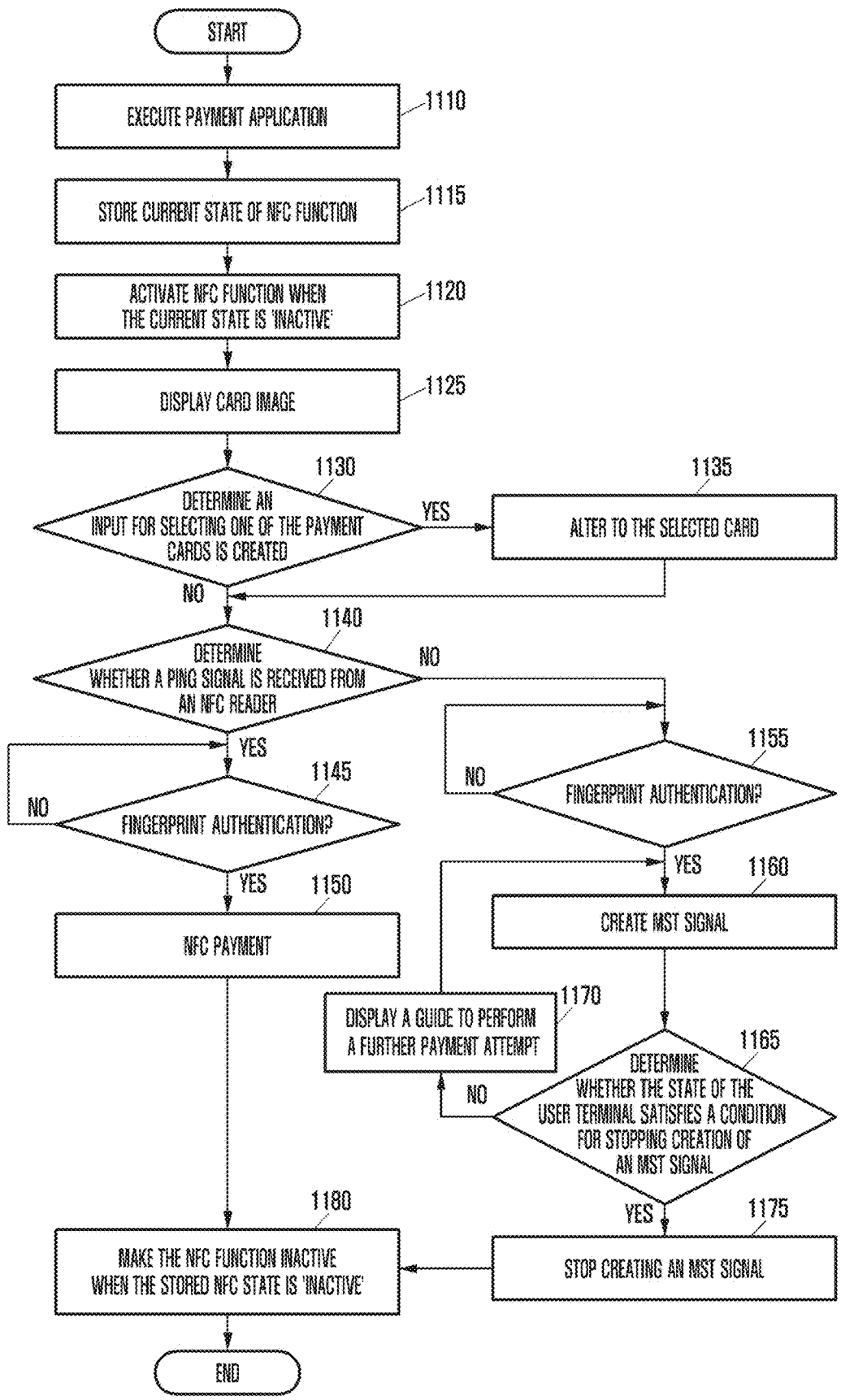
FIG. 11 is a flow diagram that describes a payment method according to a second embodiment of the present disclosure.

FIG. 11 is a flow diagram that describes a payment method according to a second embodiment of the present disclosure.

Referring to FIG. 11, the processor 110 is capable of executing a payment application in response to a particular gesture (e.g., a touch on an icon corresponding to a payment application) in operation 1110.

The processor 110 is capable of storing a current state of the NFC function in the memory 130 in operation 1115.

When the current state of the NFC function is 'inactive', the processor 110 is capable of activating the NFC function in operation 1120.

The processor 110 is capable of controlling the display 160 to show a card that has been used for payment or a preset card in operation 1125.

The processor 110 is capable of determining whether a user input for selecting a payment card is created in operation 1130. When the processor 110 ascertains that a user input for selecting a payment card is not created in operation 1130, it determines a card that has been used for payment or a preset card as a payment card and performs the following operation 1140.

When the processor 110 ascertains that a user input for selecting a payment card is created in operation 1130, it may determine the selected card (e.g., a card altered by the user input, not the preset card or a card that has been used for payment, or a plurality of cards selected by the user input) as a payment card in operation 1135, and then proceeds with the following operation 1140.

The processor 110 is capable of determining whether to receive a ping signal from an NFC reader via the NFC module 127 in operation 1140.

When the processor 110 ascertains that it has received a ping signal in operation 1040, it determines whether a user's biometric information (e.g., fingerprint) is input to check a condition as to whether the user is authenticated by using the biometric information in operation 1145. When the processor 110 ascertains that the user is not authenticated in operation 1145, it may repeat the determination of operation 1145.

When the processor 110 ascertains that the user is authenticated in operation 1145, it may provide card information for payment to the card reading apparatus (e.g., an NFC reader) via the NFC module 127 in operation 1150, and proceeds with the following operation 1180 (1175).

When the processor 110 ascertains that it has not received a ping signal in operation 1140, it determines whether a user's biometric information (e.g., fingerprint) is input to check a condition as to whether the user is authenticated by using the biometric information in operation 1155. When the processor 110 ascertains that the user is not authenticated in operation 1155, it may repeat the determination of operation 1155.

When the processor 110 ascertains that the user is authenticated in operation 1155, it may control the MST module 128 to create an MST signal with information regarding a payment card in operation 1160. Alternatively, the processor 110 determines whether a state of the handheld electronic device 101 satisfies a preset MST signal creation-initiation condition (e.g., one of the conditions described above referring to FIGS. 5A to 5D to FIGS. 8A and 8B). When the processor 110 ascertains that a state of the handheld electronic device 101 satisfies a preset MST signal creation-initiation condition and the user is authenticated, it may also control the MST module 128 to create an MST signal.

After that, the processor 110 determines whether the state of the handheld electronic device 101 (or user terminal) satisfies a condition for stopping creation of an MST signal in operation 1165. When the processor 110 ascertains that the state of the handheld electronic device 101 (or user terminal) does not satisfy a condition for stopping creation of an MST signal in operation 1165, it provides a guide for the user to perform a further payment attempt in operation 1170, and returns to operation 1160.

When the processor 110 ascertains that the state of the handheld electronic device 101 (or user terminal) satisfies a condition for stopping creation of an MST signal in operation 1165, it controls the MST module 128 to stop creating an MST signal in operation 1175.

After that, the processor 110 checks the stored, current state of the NFC function. When the processor 110 ascertains that the stored, current state of the NFC function is 'inactive', it may make the NFC function inactive in operation 1180.

Figure 12:
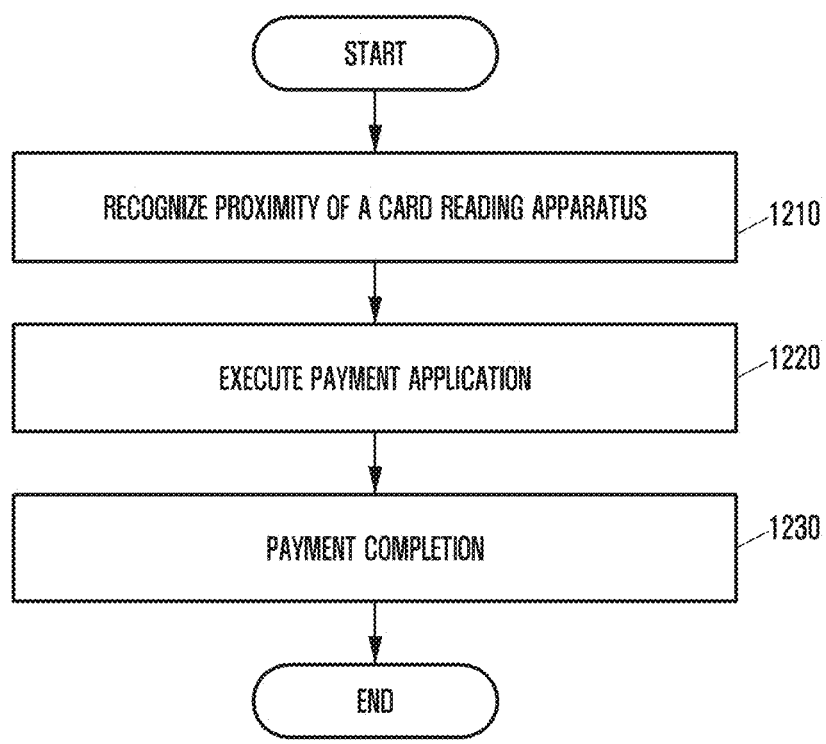
FIG. 12 is a flow diagram that describes a method of automatically executing a payment application, according to various embodiments of the present disclosure.

FIG. 12 is a flow diagram that describes a method of automatically executing a payment application, according to various embodiments of the present disclosure.

Referring to FIG. 12, the processor 110 is capable of recognizing proximity of a card reading apparatus in operation 1210. For example, the processor 110 is capable of determining that the handheld electronic device 101 is near a card reading apparatus for one of the following cases: 1) the processor 110 receives a feedback signal (e.g., Ping) for NFC from the card reading apparatus via the communication module 120; 2) the processor 110 recognizes a magnetic field created in the card reading apparatus; 3) the processor 110 receives a tag-related NFC signal from an NFC tag attached to the card reading apparatus; and 4) the processor 110 recognizes that a taken image contains a predefined shape (e.g., a letter, symbol, image, etc. representing a location of a header or a card shape). When the processor 110 recognizes proximity of the card reading apparatus, it is capable of executing a payment application to make a payment in operation 1220. The processor 110 determines whether payment has been made, and stops, when payment has been made, the payment application running on the handheld electronic device 101 in operation 1230.

Figure 13:
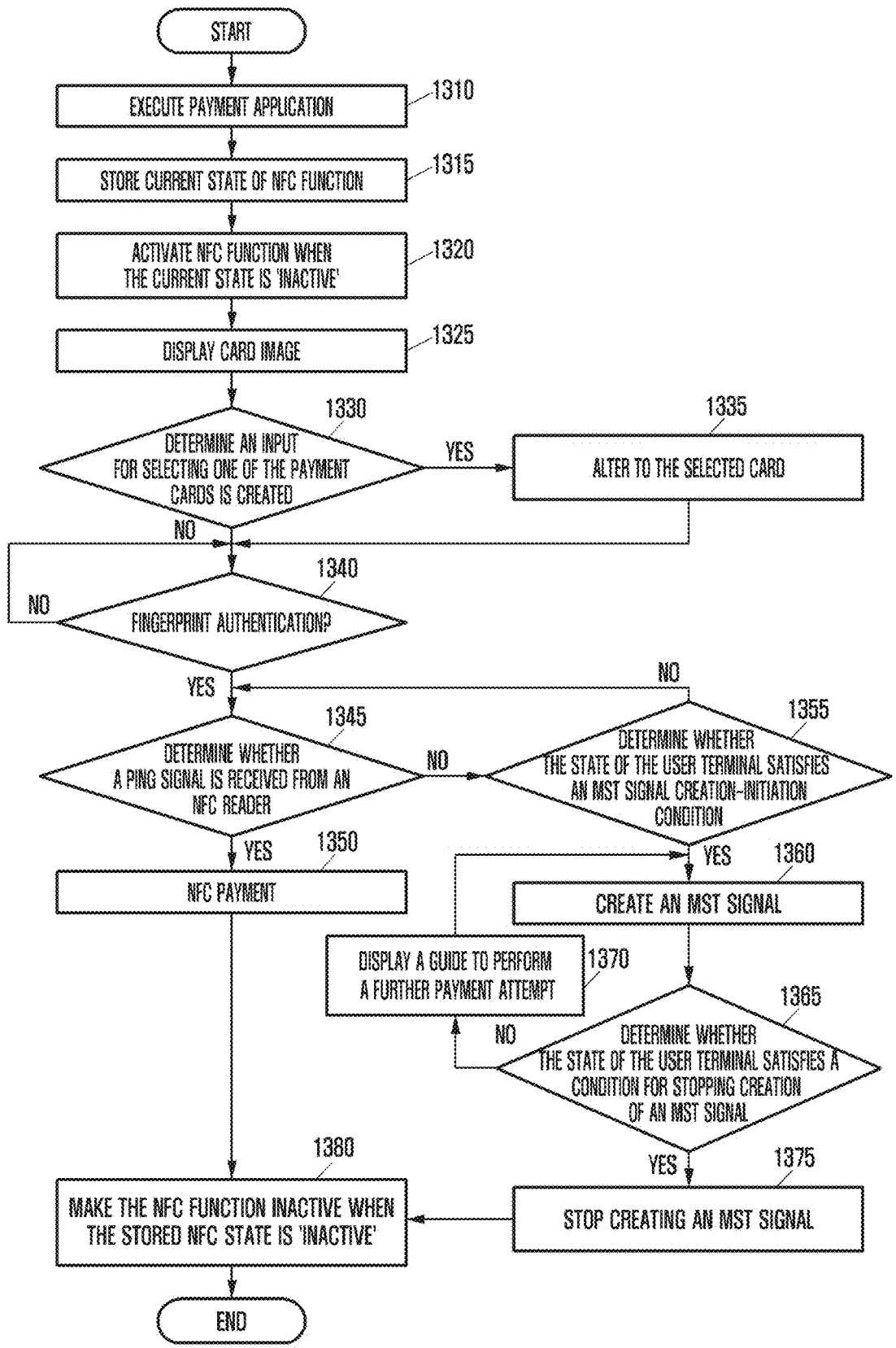
FIG. 13 is a flow diagram that describes a payment method according to a third embodiment of the present disclosure.

FIG. 13 is a flow diagram that describes a payment method according to a third embodiment of the present disclosure.

When the processor 110 recognizes proximity of a card reading apparatus or a user input (e.g., a gesture applied to an icon corresponding to a payment application, such as tapping, dragging, swiping, etc.), it is capable of executing a payment application in operation 1310.

The processor 110 is capable of storing a current state of the NFC function in the memory 130 in operation 1315.

When the current state of the NFC function is 'inactive', the processor 110 is capable of activating the NFC function in operation 1320.

The processor 110 is capable of controlling the display 160 to show a card that has been used for payment or a preset card in operation 1325.

The processor 110 is capable of determining whether a user input for selecting a payment card is created in operation 1330. When the processor 110 ascertains that a user input for selecting a payment card is not created in operation 1330, it determines a card that has been used for payment or a preset card as a payment card and performs the following operation 1340.

When the processor 110 ascertains that a user input for selecting a payment card is created in operation 1330, it may determine the selected card (e.g., a card altered by the user input, not the preset card or a card that has been used for payment, or a plurality of cards selected by the user input) as a payment card in operation 1335, and then proceeds with the following operation 1340.

The processor 110 is capable of authenticating a user by using a user's biometric information (e.g., fingerprint) in operation 1340. When the processor 110 ascertains that the user is not authenticated in operation 1340, it may repeat the user authentication process of operation 1340.

When the processor 110 ascertains that the user is authenticated in operation 1340, it is capable of controlling the NFC module 127 and the MST module 128 to switch the mode of the NFC module 127 to a poling mode to detect the card reading apparatus, and simultaneously to create an MST signal via the MST module 128.

The processor 110 is capable of determining whether to receive a ping signal from an NFC reader via the NFC module 127 in operation 1345. When the processor 110 ascertains that it has received a ping signal in operation 1345, it is capable of stopping operation of the MST module 128. The processor 110 provides card information for payment to the card reading apparatus (e.g., an NFC reader) via the NFC module 127 of which the mode is switched to a card mode in operation 1350, and proceeds with the following operation 1380.

When the processor 110 ascertains that it has not received a ping signal in operation 1345, it determines whether a state of the handheld electronic device 101 (or a user terminal) satisfies an MST signal creation-initiation condition (e.g., one of the conditions described above referring to FIGS. 5A to 5D to FIGS. 8A and 8B) in operation 1355. When the processor 110 ascertains that a state of the handheld electronic device 101 does not satisfy an MST signal creation-initiation condition, it returns to operation 1345.

When the processor 110 ascertains that a state of the handheld electronic device 101 satisfies an MST signal creation-initiation condition, it may control the MST module 128 to create an MST signal with information regarding a payment card in operation 1360.

The processor 110 determines whether the state of the handheld electronic device 101 (or user terminal) satisfies a condition for stopping creation of an MST signal in operation 1365. When the processor 110 ascertains that the state of the handheld electronic device 101 (or user terminal) does not satisfy a condition for stopping creation of an MST signal in operation 1365, it provides a guide for the user to perform a further payment attempt in operation 1370, and returns to operation 1360.

When the processor 110 ascertains that the state of the handheld electronic device 101 (or user terminal) satisfies a condition for stopping creation of an MST signal in operation 1365, it controls the MST module 128 to stop creating an MST signal in operation 1375.

After that, the processor 110 checks the stored, current state of the NFC function. When the processor 110 ascertains that the stored, current state of the NFC function is 'inactive', it may make the NFC function inactive in operation 1380.

Figure 14:
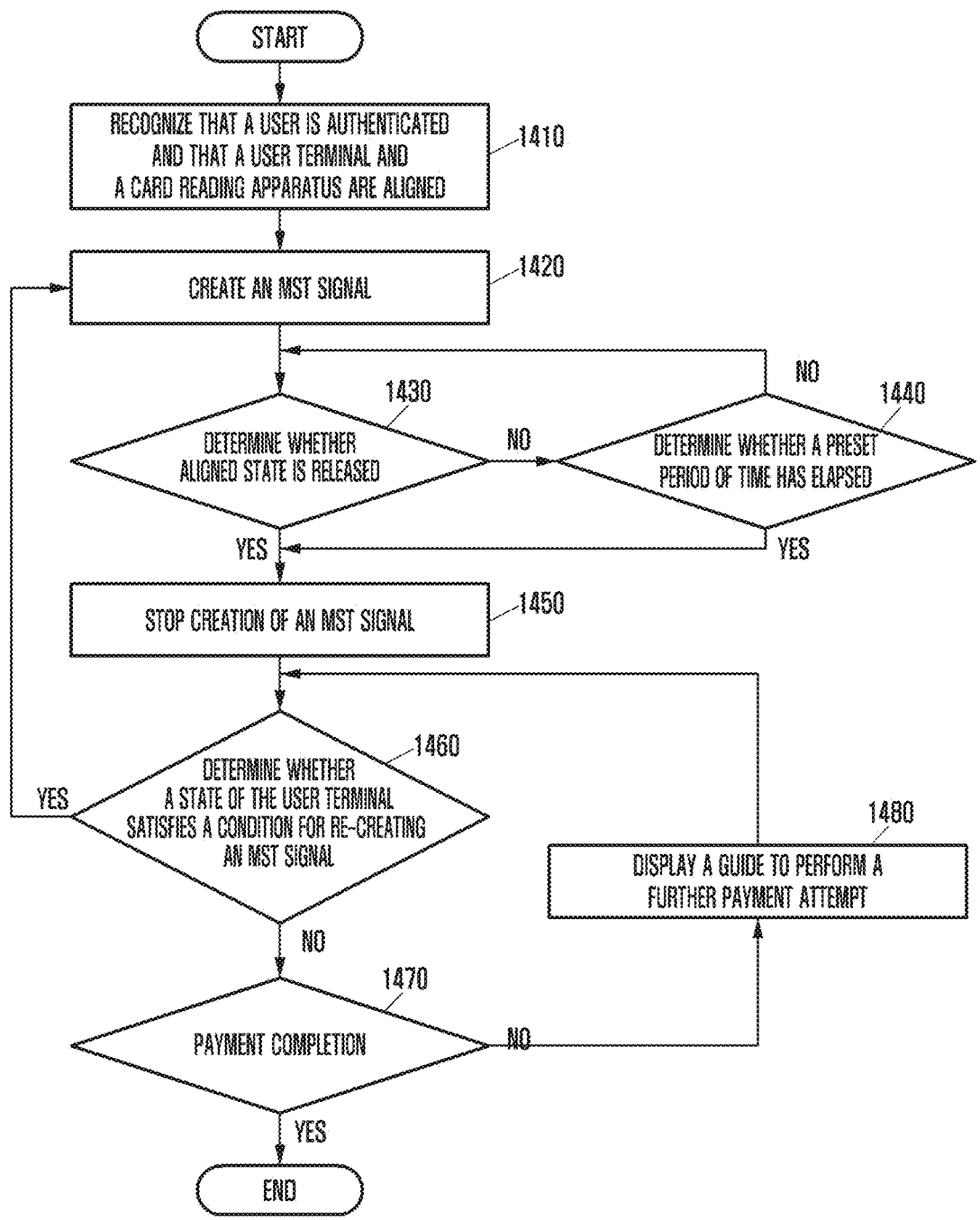
FIG. 14 is a flow diagram that describes a payment method according to a fourth embodiment of the present disclosure.

FIG. 14 is a flow diagram that describes a payment method according to a fourth embodiment of the present disclosure.

Referring to FIG. 14, the processor 110 is capable of recognizing that a user is authenticated and that the handheld electronic device 101 and the card reading apparatus are aligned with each other in operation 1410. An example of the user authentication is fingerprint authentication. When the processor 110 ascertains that the handheld electronic device 101 satisfies an MST signal creation-initiation condition (e.g., one of the conditions described above referring to FIGS. 5A to 5D to FIGS. 8A and 8B), it may determine that the handheld electronic device 101 is aligned with the card reading apparatus.

When the processor 110 recognize the user authentication and the aligned state in operation 1410, it may control the MST module 128 to periodically create an MST signal with information regarding a payment card in operation 1420.

The processor 110 is capable of determining whether the aligned state is released in operation 1430.

When the processor 110 ascertains that the aligned state is released in operation 1430, it performs the following operation 1450. Examples of the release of aligned state are a case where the intensity of a magnetic field detected by the handheld electronic device 101 is less than a preset threshold, a case where the handheld electronic device 101 is moving, etc.

When the processor 110 ascertains that the release of aligned state is not released in operation 1430, it determines whether a preset period of time has elapsed from a time point that an MST signal starts to be created in operation 1440.

When the processor 110 ascertains that a preset period of time has not elapsed from a time point that an MST signal starts to be created in operation 1440, it returns to operation 1430.

When the processor 110 ascertains that a preset period of time has elapsed from a time point that an MST signal starts to be created in operation 1440, it performs the following operation 1450.

The processor 110 controls the MST module 128 to stop creation of an MST signal in operation 1450.

The processor 110 determines whether a state of the handheld electronic device 101 (or user terminal) satisfies a condition for re-creating an MST signal in operation 1460.

When a state of the handheld electronic device 101 (or user terminal) satisfies a condition for re-creating an MST signal (e.g., the handheld electronic device 101 is re-aligned with the card reading apparatus) in operation 1460, the processor 110 returns to operation 1420.

When a state of the handheld electronic device 101 (or user terminal) does not satisfy a condition for re-creating an MST signal in operation 1460, the processor 110 determines whether payment has been made in operation 1470.

When the processor 110 ascertains that payment has been made (e.g., the processor 110 receives a payment completion message from a payment server) in operation 1470, it may stops the payment procedure. On the contrary, when the processor 110 does not recognize payment completion in operation 1470, it outputs (displays) a guide for the user to perform a further payment attempt in operation 1480, and returns to operation 1460.

Figure 15:
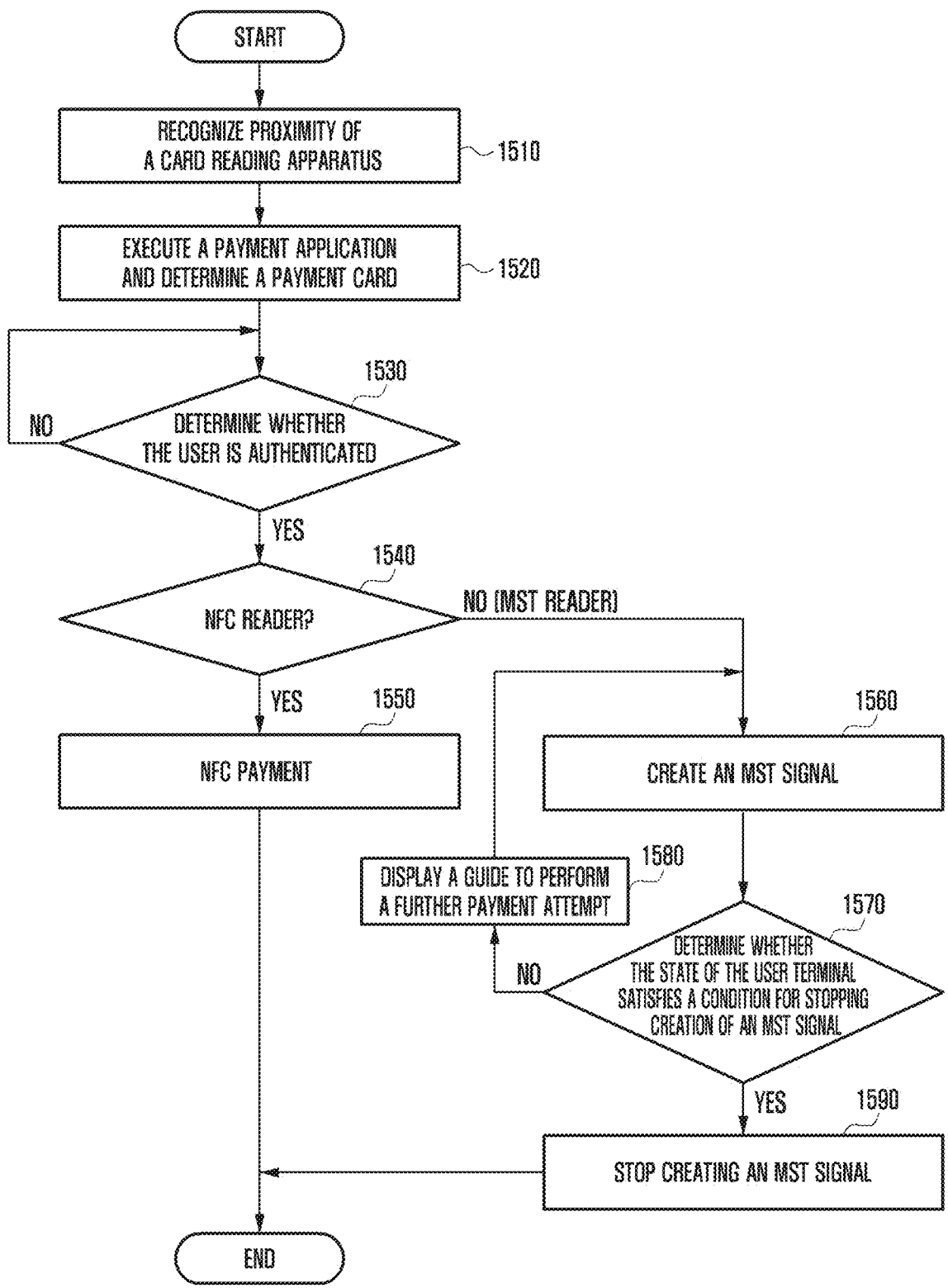
FIG. 15 is a flow diagram that describes a payment method according to a fifth embodiment of the present disclosure.

FIG. 15 is a flow diagram that describes a payment method according to a fifth embodiment of the present disclosure.

Referring to FIG. 15, the processor 110 is capable of recognizing proximity of a card reading apparatus in operation 1510. For example, the processor 110 is capable of determining that the handheld electronic device 101 is adjacent to a card reading apparatus for one of the following cases: 1) the processor 110 receives a feedback signal (e.g., Ping) for NFC from the card reading apparatus via the communication module 120; 2) the processor 110 recognizes a magnetic field created in the card reading apparatus; 3) the processor 110 receives a tag-related NFC signal from an NFC tag attached to the card reading apparatus; and 4) the processor 110 recognizes that an image taken by a camera contains a predefined shape.

When the processor 110 recognizes proximity of the card reading apparatus, it is capable of executing a payment application and determining one of the cards as a payment card via interaction with the user in operation 1520. Alternatively, the processor 110 may also determine a card that has been used for payment or a preset card from among the cards as a payment card.

The processor 110 is capable of determining whether the user is authenticated (e.g., fingerprint authentication) in operation 1530. When the processor 110 ascertains that the user is not authenticated in operation 1530, it provides the user with a guide to perform user authentication and repeats operations 1530. Examples of the method of providing a guide to the user are: a method of displaying an information screen on the display 160; a method of indicating a state by using a sound, a vibration, or light by an indicator such as LED, etc.; a method of informing the user of a guide by using an external device (e.g., a wearable device such as a smart watch, etc.) in such a way that, when the handheld electronic device 101 transmits an authentication request signal to the external device, the external device shows a guide on the display; etc. When the processor 110 ascertains that the user is authenticated in operation 1530, it is capable of determining whether the card reading apparatus near the handheld electronic device 101 is an NFC reader or an MST reader in operation 1540.

When the processor 110 ascertains that the card reading apparatus near the handheld electronic device 101 is an NFC reader (e.g., the processor 110 receives a ping signal) in operation 1540, it switches the operation mode of the NFC module 127 to a card mode and provides information related to a payment card to the NFC reader in operation 1550.

When the processor 110 ascertains that the card reading apparatus near the handheld electronic device 101 is an MST reader (the processor 110: recognizes a magnetic field; receives an NFC signal from an NFC tag attached to the card reading apparatus; or detects a user gesture) in operation 1540, it is capable of controlling the MST module 128 to create an MST signal with information regarding a payment card in operation 1560. Alternatively, the processor 110 determines whether a state of the handheld electronic device 101 satisfies a preset MST signal creation-initiation condition (e.g., one of the conditions described above referring to FIGS. 5A to 5D to FIGS. 8A and 8B). When the processor 110 ascertains that a state of the handheld electronic device 101 satisfies a preset MST signal creation-initiation condition and the user is authenticated, it may also control the MST module 128 to create an MST signal.

After that, the processor 110 determines whether the state of the handheld electronic device 101 (or user terminal) satisfies a condition for stopping creation of an MST signal in operation 1570. When the processor 110 ascertains that the state of the handheld electronic device 101 (or user terminal) does not satisfy a condition for stopping creation of an MST signal in operation 1570, it provides a guide for the user to perform a further payment attempt in operation 1580, and returns to operation 1560.

When the processor 110 ascertains that the state of the handheld electronic device 101 (or user terminal) satisfies a condition for stopping creation of an MST signal in operation 1570, it controls the MST module 128 to stop creating an MST signal in operation 1590.

Figure 16:
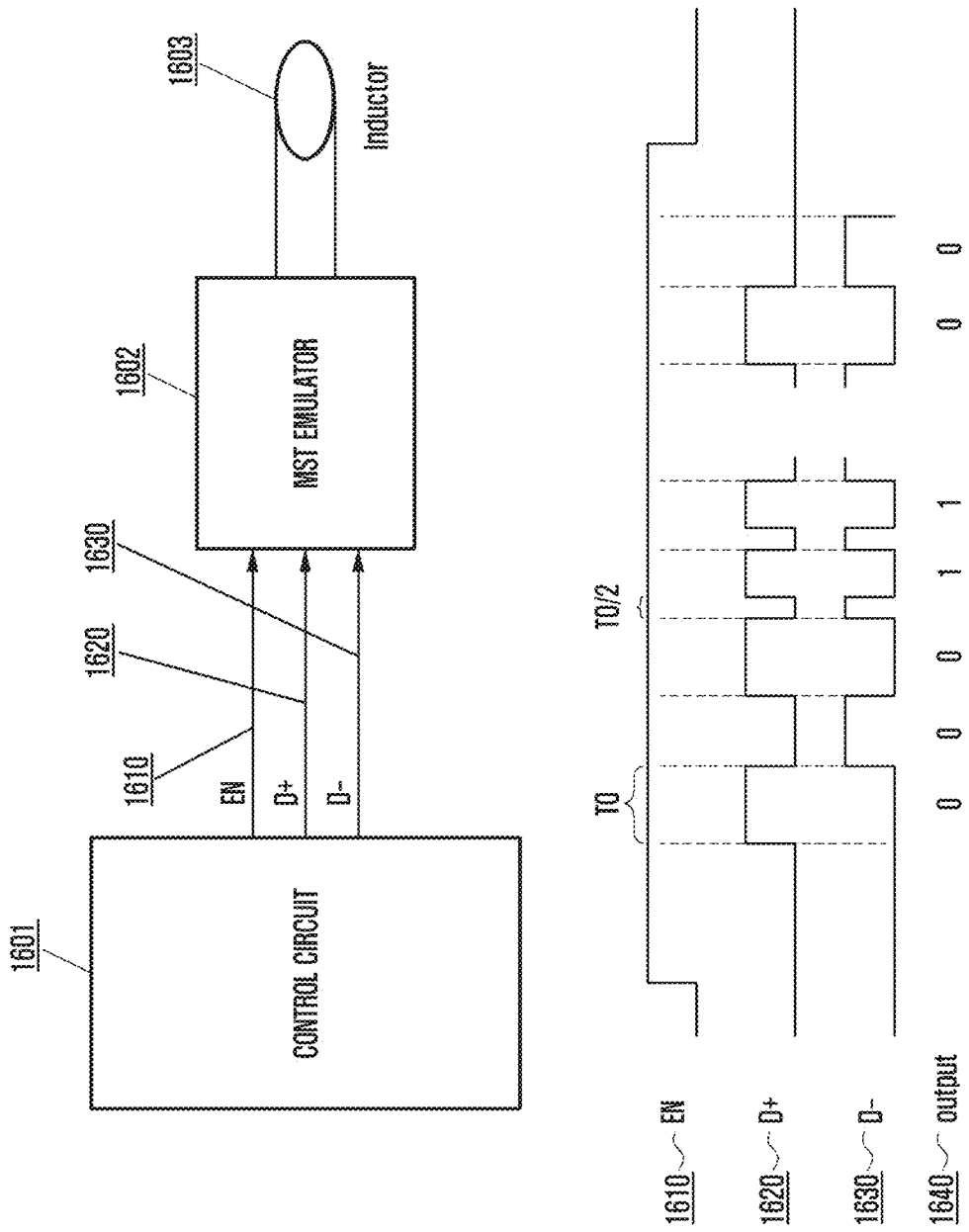
FIG. 16 shows diagrams that describe an MST module according to various embodiments of the present disclosure.

FIG. 16 shows diagrams that describe an MST module according to various embodiments. It should be understood that the configuration of the MST module shown in FIG. 16 is an example and the present invention is not limited thereto.

Referring to FIG. 16, the MST module 128 is capable of receiving control signals 1610, 1620 and 1630 from a control circuit 1601 including a processor 110. The MST emulator 1602 is capable of converting payment information into magnetic field signals to broadcast the magnetic field signals via an MST antenna, according to the control signal. The control circuit 1601 is capable of providing signals, EN, D+, and D−. When an MST signal interval starts in a signal cycle, the control circuit 1601 maintains the EN signal at a logic level, High, so that the MST emulator 1602 operates.

When the EN signal is maintained at a logic level, High, the control circuit 1601 is capable of providing payment information such as information regarding a credit card, etc., via signals D+ and D−. The signals D+ and D− have waveforms that have opposite phase or are 180° out of phase relative to each other. When the states of the signals D+ and D− are maintained during a specified interval, T0, the output value 1640, OUTPUT, is 0. When the states of the signals D+ and D− vary during a specified interval, T0, the output value, OUTPUT, is 1. The payment receiving apparatus combines the bit values corresponding to the output values, OUTPUT, to recognize the payment information.

According to various embodiments, the MST emulator 1602 is connected to an MST antenna 1603 configured with a plurality of coils that differ from each other. According to another embodiment, the MST emulator 1602 provides a plurality of input units and a plurality of output units, and the MST antenna 1603 is configured with a plurality of different coils connected to a plurality of output units included in the MST emulator 1602.

Figure 17A:
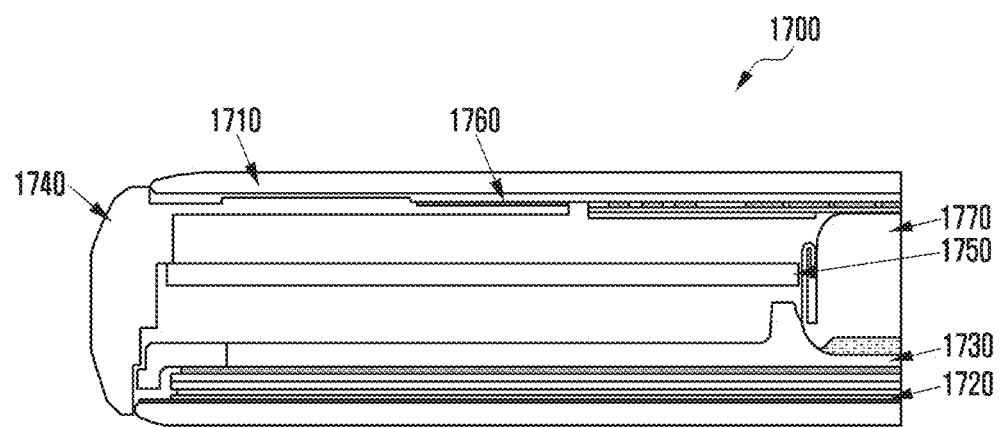
FIGS. 17A, 17B and 17C are diagrams showing configurations of an electronic device with an antenna for magnetic payment and the antenna, according to various embodiments of the present disclosure.
Figure 17B:
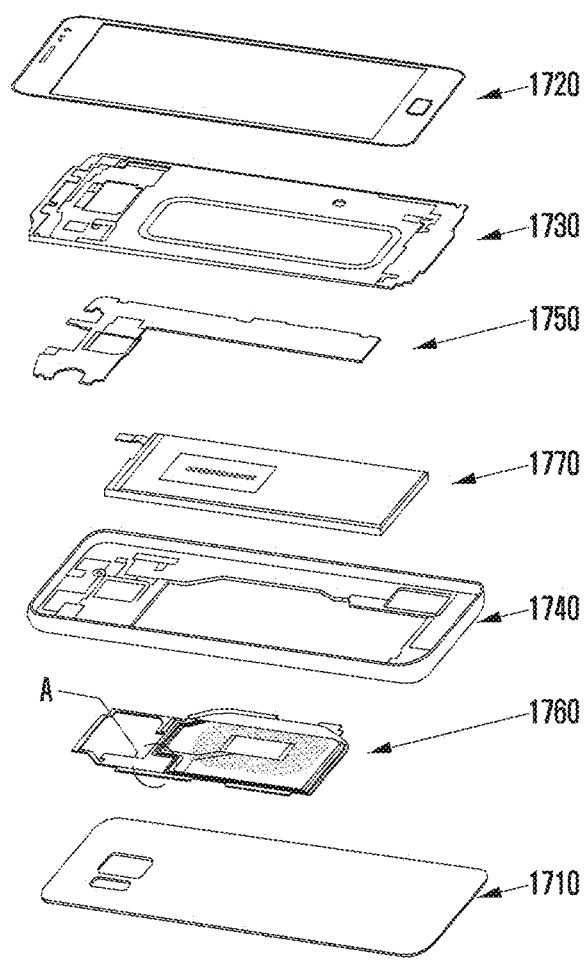
Figure 17C:
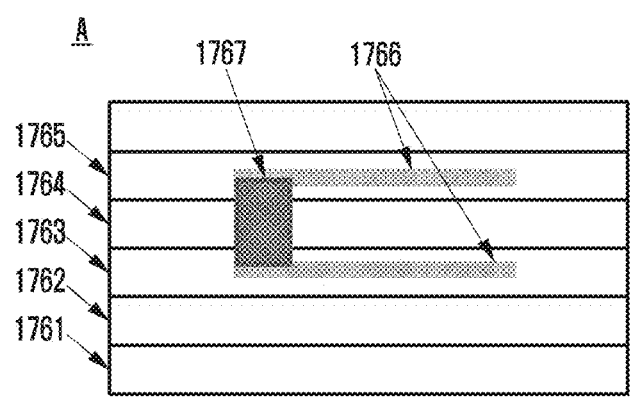

FIGS. 17A to 17C are diagrams showing configurations of an electronic device with an antenna for magnetic payment and the antenna, according to another embodiment of the present disclosure.

Referring to FIGS. 17A and 17B, the handheld electronic device 1700 is capable of including housings 1710, 1720, and 1740, located to disclose at least part of the appearance of the handheld electronic device 1700, and a support 1730 located inside the handheld electronic device 1730. The housing 1740 is made of a single material or a mixture of heterogeneous materials. The housing 1740 may be arranged to support at least part of the housings 1710 and 1720. The internal support 1730 is made of a single material or a mixture of heterogeneous materials. The internal support 1730 may be arranged to support at least part of the housing 1720. At least part of the housings 1710 and 1720 may include the display area. The housings 1710 and 1740 and the support 1730 form an enclosure. The enclosure is capable of including a Printed Circuit Board (PCB) 1750 and a battery 1770.

According to various embodiments, the handheld electronic device 1700 is capable of including an antenna 1760 (e.g., a coil antenna) for magnetic payment. The antenna 1760 is located to cover at least part of the housing 1740 and the battery 1770. The antenna 1760 is connected to the PCB 1750 through an opening of the housing 1740 to make a communication of data for payment with a payment module 120 or a processor 110 located on the PCB 1750. The housings 1740 and 1710 may be formed in such a way that part of the area to which the antenna 1770 is attached differs in height or thickness from the souring area.

According to various embodiments, the housing 1740 may be formed in such a way that an area where a coil (e.g., a metal pattern) of the antenna 1760 is located is made of a material that differs from that of another area where the coil of the antenna 1760 is not located. For example, the area where the coil of the antenna 1760 is located may include a non-conductive material (e.g., plastic). The area where the coil of the antenna 1760 is not located may include a conductive material (e.g., metal).

Referring to FIG. 17C, the antenna 1760 may be formed using a Flexible Printed Circuit Board (FPCB) including multi-layers 1763, 1764 and 1765. At least one of the multi-layers 1763, 1764 and 1765 is capable of including a via 1767 and wires 1766 forming an antenna coil. The antenna 1760 may be configured with a single coil. The antenna 1760 may also be configured with two or more coils that differ from each other. According to various embodiments, the antenna 1760 is capable of including a layer 1761 for shielding noise. The shield layer 1761 may be formed with a material such as graphite, etc. According to another embodiment, the antenna 1760 may further include a magnetic body layer 1762 for increasing the intensity of magnetic field signals produced by the coil. The magnetic body layer 1762 may be formed with, for example, a permanent magnet, ferromagnetic material, etc.

Figure 18:
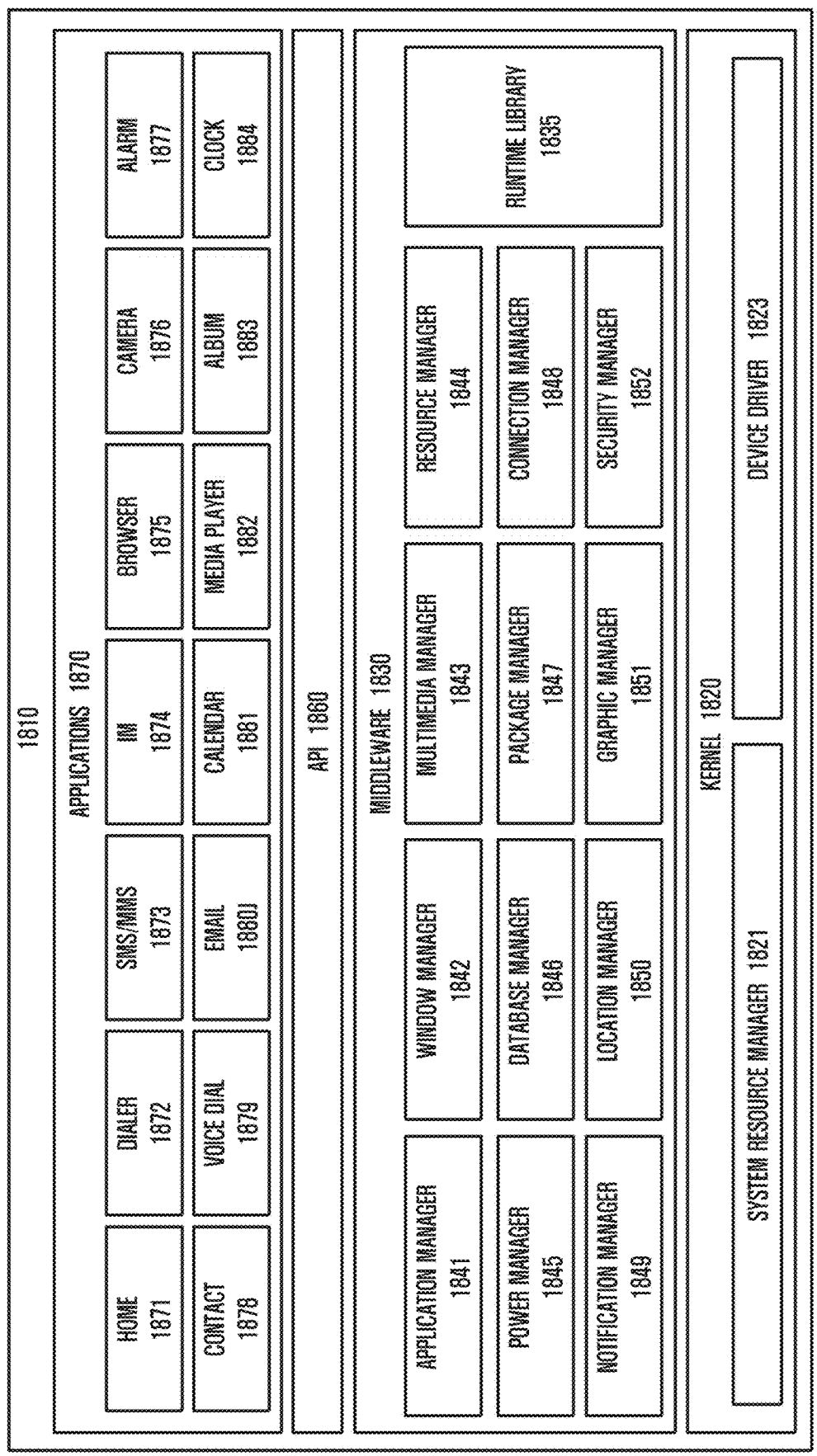
FIG. 18 is a block diagram of a program module according to various embodiments of the present disclosure.

FIG. 18 is a block diagram of a programming module according to various embodiments. According to an embodiment, the program module 1810 (e.g., program module 14 shown in FIG. 1) is capable of including an operation system (OS) for controlling resources related to the electronic device (e.g., electronic device 11) and/or various applications (e.g., application programs 14D shown in FIG. 1) running on the OS. The OS may be ANDROID, iOS, WINDOWS, SYMBIAN, TIZEN, BADA, etc.

The program module 1810 is capable of including a kernel 1820, middleware 1830, application programming interface (API) 1860 and/or applications 1870. At least part of the program module 1810 may be preloaded on the electronic device or downloaded from a server (e.g., an electronic device 19A or 19B, server 106, etc.).

The kernel 1820 (for example, kernel 14A) may include a system resource manager 1821 and/or a device driver 1823. The system resource manager 1821 may include, for example, a process manager, a memory manager, and a file system manager. The system resource manager 1821 may perform a system resource control, allocation, and recall. The device driver 1823 may include, for example, a display driver, a camera driver, a BLUETOOTH driver, a shared memory driver, a USB driver, a keypad driver, a WiFi driver, and an audio driver. Further, according to an embodiment, the device driver 312 may include an Inter-Process Communication (IPC) driver.

The middleware 1830 may provide a function required in common by the applications 1870. Further, the middleware 1830 may provide a function through the API 1860 to allow the applications 1870 to efficiently use limited system resources within the electronic device. According to an embodiment, the middleware 1830 (for example, the middleware 14B) may include at least one of a runtime library 1835, an application manager 1841, a window manager 1842, a multimedia manager 1843, a resource manager 1844, a power manager 1845, a database manager 1846, a package manager 1847, a connection manager 1848, a notification manager 1849, a location manager 1850, a graphic manager 1851, and a security manager 1852.

The runtime library 1835 may include, for example, a library module used by a complier to add a new function through a programming language while the applications 1870 are executed. According to an embodiment, the runtime library 1835 executes input and output, management of a memory, a function associated with an arithmetic function and the like.

The application manager 1841 may manage, for example, a life cycle of at least one of the applications 1870. The window manager 1842 may manage GUI resources used on the screen. The multimedia manager 1843 may detect a format required for reproducing various media files and perform an encoding or a decoding of a media file by using a codec suitable for the corresponding format. The resource manager 1844 manages resources such as a source code, a memory, or a storage space of at least one of the applications 1870.

The power manager 1845 may operate together with a Basic Input/Output System (BIOS) to manage a battery or power and provides power information required for the operation. The database manager 1846 may manage generation, search, and change of a database to be used by at least one of the applications 1870. The package manager 1847 may manage an installation or an update of an application distributed in a form of a package file.

The connection manager 1848 may manage, for example, a wireless connection such as WiFi or BLUETOOTH. The notification manager 1849 may display or notify a user of an event such as an arrival message, an appointment, a proximity alarm or the like, in a manner that does not disturb the user. The location manager 1850 may manage location information of the electronic device. The graphic manager 1851 may manage a graphic effect provided to the user or a user interface related to the graphic effect. The security manager 1852 provides a general security function required for a system security or a user authentication. According to an embodiment, when the electronic device (for example, the electronic device 11) has a call function, the middleware 1830 may further include a telephony manager for managing a voice of the electronic device or a video call function.

The middleware 1830 is capable of including modules configuring various combinations of functions of the above described components. The middleware 1830 is capable of providing modules specialized according to types of operation systems to provide distinct functions. The middleware 1830 may be adaptively configured in such a way as to remove part of the existing components or to include new components.

The API 1860 (for example, API 14C) may be a set of API programming functions, and may be provided with a different configuration according to an operating system. For example, in Android or iOS, a single API set may be provided for each platform. In Tizen, two or more API sets may be provided.

The applications 1870 (e.g., application programs 14D) may include one or more applications for performing various functions, e.g., home 1871, diary 1872, SMS/MMS 1873, instant message (IM) 1874, browser 1875, camera 1876, alarm 1877, context 1878, voice dial 1879, email 1880, calendar 1881, media player 1882, album 1883, clock 1884, health care (e.g., an application for measuring amount of exercise, blood sugar level, etc.), and environment information (e.g., an application for providing atmospheric pressure, humidity, temperature, etc.).

According to an embodiment, the applications 1870 are capable of including an application for supporting information exchange between an electronic device (e.g., electronic device 11) and an external device (e.g., electronic devices 102 and 104), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 19A and 19B). In addition, the notification relay application is capable of receiving notification information from external devices to provide the received information to the user.

The device management application is capable of managing (e.g., installing, removing or updating) at least one function of an external device (e.g., electronic devices 19A and 19B) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 1870 are capable of including an application (e.g., a health care application of a mobile medical device, etc.) specified attributes of an external device (e.g., electronic devices 19A and 19B). According to an embodiment, the applications 1870 are capable of including applications received from an external device (e.g., a server 19C, electronic devices 19A and 19B). According to an embodiment, the applications 1870 are capable of including a preloaded application or third party applications that can be downloaded from a server. It should be understood that the components of the program module 1810 may be called different names according to types of operating systems.

According to various embodiments, at least part of the program module 1810 can be implemented with software, firmware, hardware, or any combination of two or more of them. At least part of the program module 1810 can be implemented (e.g., executed) by a processor (e.g., processor 12). At least part of the programming module 1810 may include modules, programs, routines, sets of instructions or processes, etc., in order to perform one or more functions.

Various embodiments of the present invention provide a handheld electronic device capable of transmitting, to a card reading apparatus, card information carried by magnetic field signals, and thus making payment for costs. Various embodiments also provide a handheld electronic device capable of making payment for costs, etc., through communication with a card reading apparatus, although the apparatus is not equipped with an NFC module, without modifying the existing solution, as if a magnetic card is used against the apparatus. Therefore, the present invention is capable of leading to activating offline mobile payment.

The term 'module' as used in various embodiments of the present disclosure may mean a unit including one of hardware, software, and firmware or any combination of two or more of them. The 'module' may be interchangeable with the term 'unit,' 'logic,' 'logical block,' 'component,' or 'circuit.' The 'module' may be the smallest unit of an integrated component or a part thereof. The 'module' may be the smallest unit that performs one or more functions or a part thereof. The 'module' may be mechanically or electronically implemented. For example, the 'module' according to various embodiments of the present invention may include at least one of the following: application-specific integrated circuit (ASIC) chips, field-programmable gate arrays (FPGAs), and programmable-logic devices for performing certain operations, which are now known or will be developed in the future.

At least part of the method (e.g., operations) or system (e.g., modules or functions) according to various embodiments can be implemented with instructions as programming modules that are stored in computer-readable storage media. One or more processors (e.g., processor 12) can execute instructions, thereby performing the functions. An example of the computer-readable storage media may be a memory 13. At least part of the programming modules can be implemented (executed) by a processor. At least part of the programming module may include modules, programs, routines, sets of instructions or processes, etc., in order to perform one or more functions.

Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to various embodiments may include one or more components, remove part of them described above, or include new components. The operations performed by modules, programming modules, or the other components, according to various embodiments, may be executed in serial, parallel, repetitive or heuristic fashion. Part of the operations can be executed in any other order, skipped, or executed with additional operations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a memory;
a display;
a processor electrically connected to the memory;
a near field communication (NFC) module and a magnetic data stripe transmission (MST) module electrically connected to the processor; and
a first antenna electrically connected to the MST module and a second antenna electrically connected to the NFC module,
wherein the memory stores instructions that, when executed by the processor, cause the electronic device to:
check a state of the NFC module when executing a payment application;
when the NFC module is recognized to be in an inactive state as a result of checking the state of the NFC module, change the state of the NFC module to an active state in order to communicate with an external device through the NFC module;
display, on the display, at least one image or text related to payment information acquired from the memory, in response to at least part of a user input;
determine whether a payment process starts, the payment process started by using the electronic device;
periodically transmit, according to determining that the payment process starts, a first signal related to the payment information via the MST module;
receive, by the NFC module, a ping signal from the external device, wherein the ping signal includes identification information representing that the external device is an NFC device;
in response to receiving the ping signal from the external device while periodically transmitting the first signal via the MST module, stop the transmission of the first signal and transmit a second signal related to the payment information via the NFC module; and when a payment using the NFC module is completed, change the state of the NFC module to the inactive state recognized as the result of checking the state of the NFC module.

2. The electronic device of claim 1, wherein the first signal and the ping signal are created by a time difference less than 1 second.

3. The electronic device of claim 1, further comprising at least one sensor electrically connected to the processor,
wherein the instructions, when executed by the processor, further cause the electronic device to determine a condition as to whether the payment process using the electronic device starts, based on an input through the at least one sensor.

4. The electronic device of claim 3, wherein the at least one sensor comprises a fingerprint sensor, and
wherein the instructions, when executed by the processor, further cause the electronic device to:
perform a user authentication based on a user input received through the fingerprint sensor while displaying the at least one image or text related to the payment information, and
based on determining that the user authentication is successful, determine that the payment process starts.

5. The electronic device of claim 1, further comprising at least one sensor electrically connected to the processor,
wherein the instructions, when executed by the processor, further cause the electronic device to determine a condition as to whether the payment process using the electronic device starts based on at least part of measurements created in the at least one sensor.

6. The electronic device of claim 1, further comprising:
a first cover on a front side of the electronic device; and
a second cover on a back side of the electronic device,
wherein the NFC module and MST module are placed closer to the second cover than the first cover.

7. The electronic device of claim 6, wherein:
the first and second antennas comprise first and second coils, respectively; and
one of the first and second antennas covers the other one of the first and second antennas as seen from above the second cover.

8. The electronic device of claim 1, wherein:
the payment information comprises information related to a credit card; and
the instructions, when executed by the processor, further cause the electronic device to:
receive the information related to the credit card from an external server,
store the received information in the memory, and
remove the stored information after a preset period of time has elapsed.

9. The electronic device of claim 1, wherein the at least one image or text comprises an image representing a real credit card.

10. The electronic device of claim 1, further comprising:
a first cover on a front side of the electronic device; and
a second cover on a back side of the electronic device,
wherein the display is partially contained in a hollow area formed between the first and second covers and disclosed through the first cover,
wherein the instructions, when executed by the processor, further cause the electronic device to display a user guide on part of a screen of the display adjacent to a place of the hollow area where the first antenna is arranged.

11. The electronic device of claim 1, further comprising at least one sensor electrically connected to the processor,
wherein the instructions, when executed by the processor, further cause the electronic device to stop transmission of the first signal, in response to a user input and/or a signal created in the at least one sensor.

12. The electronic device of claim 1, wherein the instructions, when executed by the processor, further cause the electronic device to stop transmission of the first signal after a preset period of time has elapsed.

13. The electronic device of claim 11, wherein the at least one sensor comprises at least one of an image sensor, a gyro sensor, an acceleration sensor, a proximity sensor, an HRM sensor, an air pressure sensor, a grip sensor, and a bio sensor.

14. The electronic device of claim 1, wherein the instructions, when executed by the processor, further cause the electronic device to determine whether the payment process starts based on at least of part of a tag or a signal from outside of the external device.

15. The electronic device of claim 1, wherein the electronic device is one of a mobile phone, a wearable device, a tablet computer, and a laptop computer.

16. The electronic device of claim 1, wherein the instructions, when executed by the processor, further cause the electronic device to perform a power saving function while a signal related to the payment information is transmitted via the MST module.

17. The electronic device of claim 1, wherein, in response to a payment failure, the instructions, when executed by the processor, further cause the electronic device to control the display to show a guide to perform a further payment attempt.

18. An electronic device comprising:
a memory;
a processor;
a near field communication (NFC) module a magnetic data stripe transmission (MST) module electrically connected to the processor; and
a first antenna electrically connected to the MST module and a second antenna electrically connected to the NFC module,
wherein the memory stores instructions that, when executed by the processor, cause the electronic device to:
check a state of the NFC module when executing a payment application;
when the NFC module is recognized to be in an inactive state as a result of checking the state of the NFC module, change the state of the NFC module to an active state in order to communicate with an external device through the NFC module;
determine whether a payment process starts by using the electronic device;
periodically transmit, according to determining that the payment process starts, a first signal related to payment information via the MST module, wherein the payment information is acquired from the memory;
receive, by the NFC module, a ping signal from the external device, wherein the ping signal includes identification information representing that the external device is an NFC device;
in response to receiving the ping signal from the external device while periodically transmitting the first signal via the MST module, stop the transmission of the first signal and transmit a second signal including the payment information via the NFC module; and when a payment using the NFC module is completed, change the state of the NFC module to the inactive state recognized as the result of checking the state of the NFC module.

* * * * *